United States Patent
Blom-Schieber

(10) Patent No.: US 12,280,553 B2
(45) Date of Patent: Apr. 22, 2025

(54) FIBER-REINFORCED THERMOPLASTIC COMPOSITE STRUCTURAL MEMBERS, AIRCRAFT INCLUDING THE SAME, AND RELATED METHODS

(71) Applicant: The Boeing Company, Arlington, VA (US)

(72) Inventor: Adriana W. Blom-Schieber, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 76 days.

(21) Appl. No.: 18/295,979

(22) Filed: Apr. 5, 2023

(65) Prior Publication Data
US 2024/0336016 A1    Oct. 10, 2024

(51) Int. Cl.
| | |
|---|---|
| *B29C 65/02* | (2006.01) |
| *B29C 65/00* | (2006.01) |
| *B29L 31/30* | (2006.01) |
| *B64C 1/00* | (2006.01) |

(52) U.S. Cl.
CPC ............ *B29C 66/721* (2013.01); *B29C 65/02* (2013.01); *B29C 66/52441* (2013.01); *B29C 66/914* (2013.01); *B29L 2031/3076* (2013.01); *B64C 2001/0072* (2013.01)

(58) Field of Classification Search
CPC . B29C 66/721; B29C 65/02; B29C 66/52441; B29C 66/914; B29C 65/08; B29C 66/1312; B29C 65/16; B29C 66/112; B29C 66/131; B29C 66/43441; B29C 66/474; B29C 66/524; B29C 66/723; B29C 66/73921; B29C 66/8322; B29C 66/91933; B29C 66/1122; B29L 2031/3076; B64C 2001/0072
USPC ......................................................... 264/241
See application file for complete search history.

(56) References Cited

U.S. PATENT DOCUMENTS

| | | | |
|---|---|---|---|
| 4,151,031 A | 4/1979 | Goad et al. | |
| 5,418,035 A | 5/1995 | Iguchi et al. | |
| 2006/0237588 A1* | 10/2006 | Kismarton | ............. B64C 1/065 |
| | | | 52/840 |
| 2016/0346995 A1 | 12/2016 | Butler et al. | |
| 2020/0016796 A1* | 1/2020 | Fisher, Jr. | ........... B29C 66/5326 |
| 2020/0086582 A1 | 3/2020 | Matsen et al. | |

FOREIGN PATENT DOCUMENTS

| | | |
|---|---|---|
| EP | 1918089 A2 | 5/2008 |
| EP | 1918089 A3 | 5/2008 |
| EP | 4098431 A1 | 12/2022 |

OTHER PUBLICATIONS

European Patent Office, Extended European Search Report in related Application No. EP24162230, Jul. 19, 2024.

* cited by examiner

*Primary Examiner* — Hannah J Pak
(74) *Attorney, Agent, or Firm* — Kolitch Romano Dascenzo Gates LLC

(57) ABSTRACT

Fiber-reinforced thermoplastic composite structural members (FRTCSM), aircraft including the same, and related methods are disclosed herein. The FRTCSMs include a first thermoplastic sub-structure that includes a first web, a first flange that extends away from the first web, and a first transition region between the first flange and the first web. The FRTCSMs also include a second thermoplastic sub-structure that includes a second web, a second flange that extends away from the second web, and a second transition region between the second flange and the second web. The first web is welded to the second web. The aircraft include at least one FRTCSM. The methods include positioning the first thermoplastic sub-structure and the second thermoplastic sub-structure such that the first web faces the second web, compressing the first web and the second web together, and welding the first web and the second web to one another.

20 Claims, 18 Drawing Sheets

FIBER-REINFORCED THERMOPLASTIC COMPOSITE STRUCTURAL MEMBERS, AIRCRAFT INCLUDING THE SAME, AND RELATED METHODS

FIELD

The present disclosure relates generally to fiber-reinforced thermoplastic composite structural members, to aircraft that include the fiber-reinforced thermoplastic composite structural members, to methods of forming the fiber-reinforced thermoplastic composite structural members, and/or to methods of forming aircraft that include the fiber-reinforced thermoplastic composite structural members.

BACKGROUND

Fiber-reinforced thermoplastic composite structures may be fabricated utilizing a variety of different techniques. However, conventional fabrication techniques for fiber-reinforced thermoplastic composite structures require that a radius filler, or noodle, be utilized to fill any void space within such structures. Radius fillers are time-consuming and/or expensive to fabricate. In addition, it often is challenging to fabricate a radius filler with a shape and/or mechanical properties that precisely match the void space to be filled by the radius filler. Thus, there exists a need for improved fiber-reinforced thermoplastic composite structural members, for aircraft including the same, and/or for related methods.

SUMMARY

Fiber-reinforced thermoplastic composite structural members (FRTCSM), aircraft including the same, and related methods are disclosed herein. The FRTCSMs include a first thermoplastic sub-structure that includes a first web, a first flange that extends away from the first web, and a first transition region between the first flange and the first web. The FRTCSMs also include a second thermoplastic sub-structure that includes a second web, a second flange that extends away from the second web, and a second transition region between the second flange and the second web. The first web is welded to the second web. The aircraft include at least one FRTCSM.

The methods include positioning the first thermoplastic sub-structure and the second thermoplastic sub-structure such that the first flange extends away from the second flange and also such that the first web faces the second web. The methods also include compressing the first web and the second web together. The methods further include welding the first web and the second web to one another to at least partially define the FRTCSM.

DESCRIPTION

Figure 1:
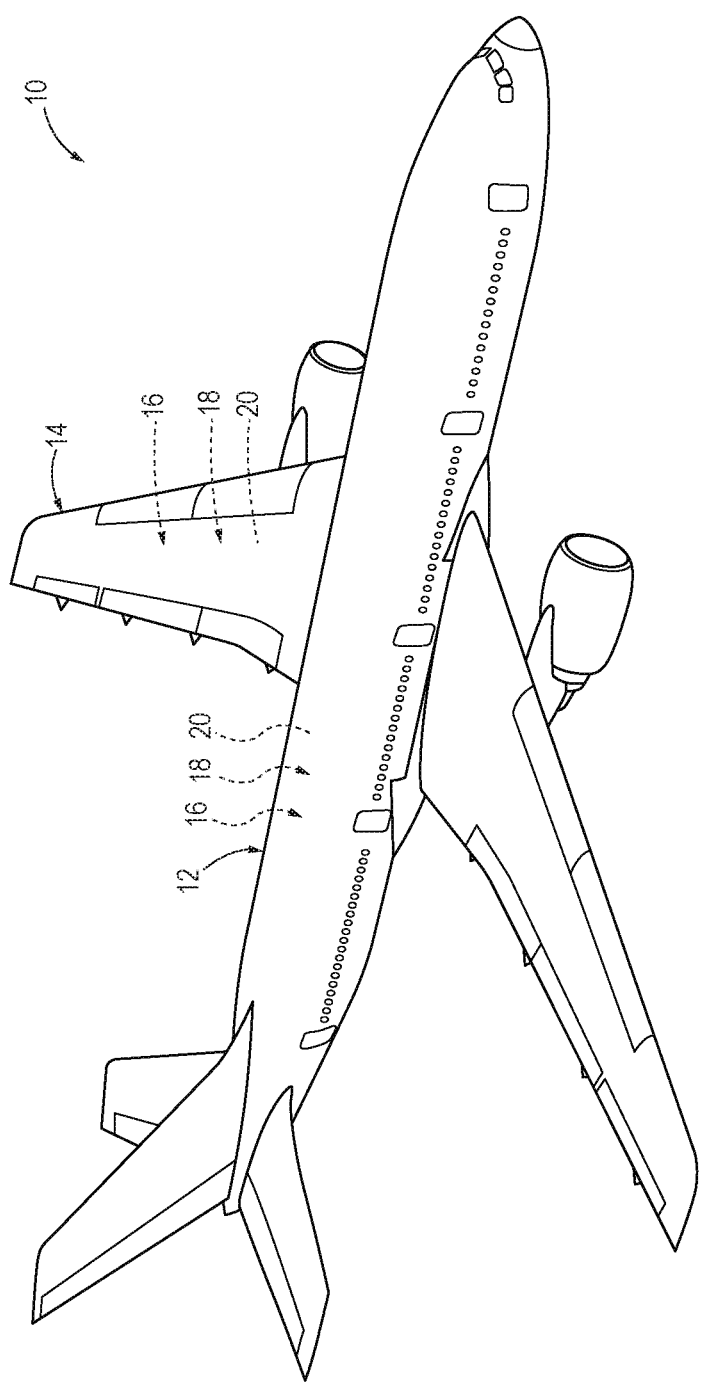
FIG. 1 is a schematic illustration of examples of an aircraft that includes at least one fiber-reinforced thermoplastic composite structural member, according to the present disclosure.

FIGS. 1-18 provide illustrative, non-exclusive examples of aircraft 10, of fiber-reinforced thermoplastic composite structural members (FRTCSMs) 20, and/or of methods 100, according to the present disclosure. Elements that serve a similar, or at least substantially similar, purpose are labeled with like numbers in each of FIGS. 1-18, and these elements may not be discussed in detail herein with reference to each of FIGS. 1-18. Similarly, all elements may not be labeled in each of FIGS. 1-18, but reference numerals associated therewith may be utilized herein for consistency. Elements, components, and/or features that are discussed herein with reference to one or more of FIGS. 1-18 may be included in and/or utilized with any of FIGS. 1-18 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 14:
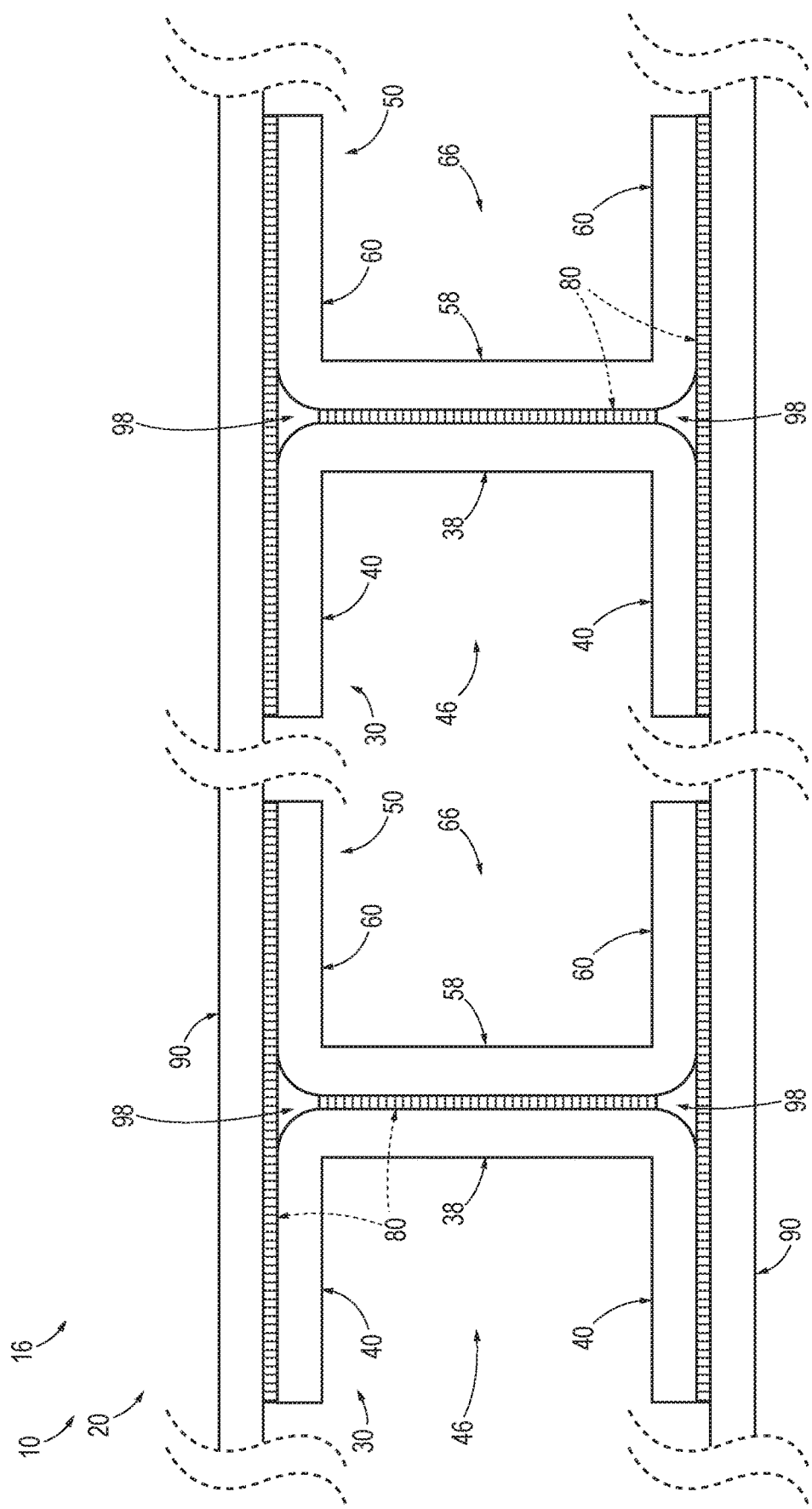
FIG. 14 is an example of a torsion box according to the present disclosure.
Figure 15:
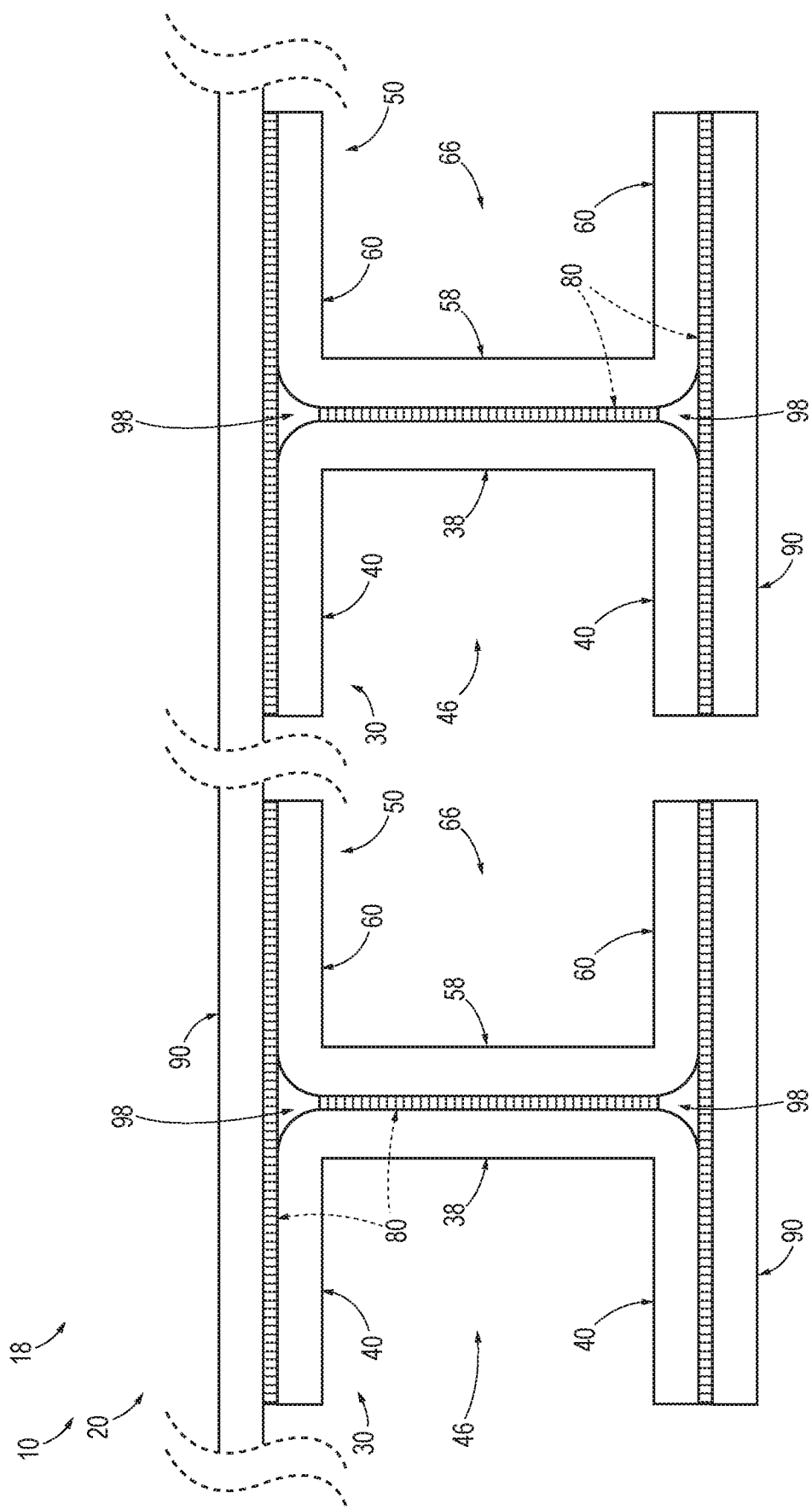
FIG. 15 is an example of a pressure deck according to the present disclosure.

FIG. 1 is a schematic illustration of examples of an aircraft 10 that includes at least one fiber-reinforced thermoplastic composite structural member (FRTCSM) 20, according to the present disclosure. As illustrated in FIG. 1, aircraft 10 includes a fuselage structure 12 and a wing structure 14. At least one component of aircraft 10, such as fuselage structure 12 and/or wing structure 14 includes and/or is at least partially defined by FRTCSM 20. In specific examples, and as discussed in more detail herein, FRTCSM 20 may form a portion of and/or may at least partially define a torsion box 16 of aircraft 10, an example of which is illustrated in FIG. 14, and/or a pressure deck 18 of aircraft 10, an example of which is illustrated in FIG. 15. FRTCSM 20 may be incorporated into aircraft 10 in any suitable manner, such as being fastened, welded, and/or thermoplastically welded to one or more other components of aircraft 10.

Figure 2:
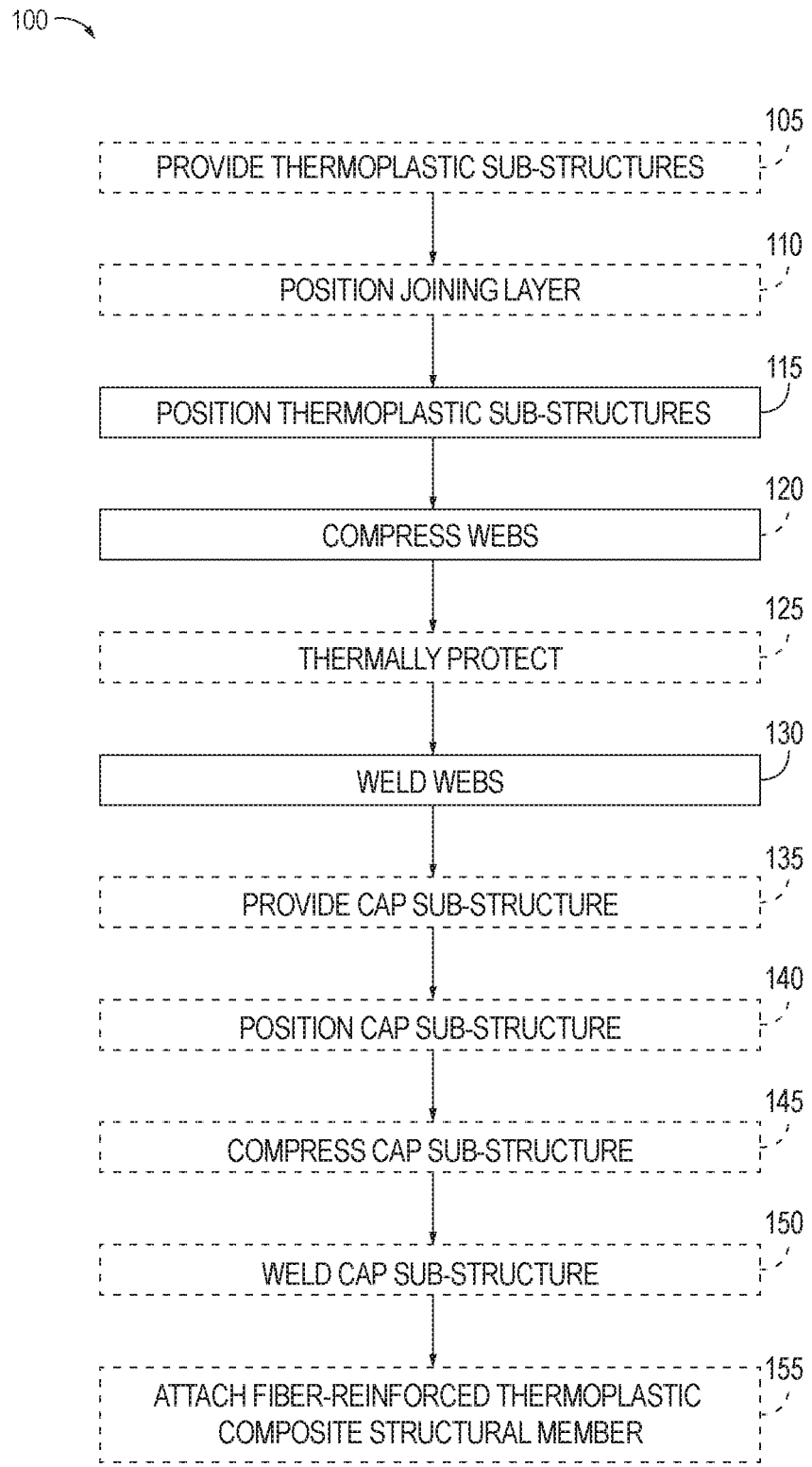
FIG. 2 is a flowchart depicting examples of methods according to the present disclosure.

FIG. 2 is a flowchart depicting examples of methods 100 of forming a FRTCSM and/or of forming an aircraft that includes at least one FRTCSM, according to the present disclosure. Examples of the aircraft and/or components thereof are disclosed herein with reference to aircraft 10. Examples of the FRTCSM are disclosed herein with reference to FRTCSM 20. As collectively illustrated by the schematic examples of FIGS. 3-15, and as discussed in more detail herein, FRTCSM 20 includes a first thermoplastic sub-structure 30 and a second thermoplastic sub-structure 50. First thermoplastic sub-structure 30 includes a first web 38, a first flange 40 that extends away from first web 38, and a first transition region 44 between first flange 40 and first web 38. Similarly, second thermoplastic sub-structure 50 includes a second web 58, a second flange 60 that extends away from second web 58, and a second transition region 64 between second flange 60 and second web 58.

Methods 100 may include providing a thermoplastic sub-structure at 105 and/or positioning a joining layer at 110 and include positioning thermoplastic sub-structures at 115 and compressing webs at 120. Methods 100 also may include thermally protecting at 125 and include welding the webs at 130. Methods 100 further may include proving a cap sub-structure at 135, positioning the cap sub-structure at 140, compressing the cap sub-structure at 145, and/or welding the cap sub-structure at 150. Methods 100 also may include attaching the fiber-reinforced thermoplastic composite structural member at 155.

Method steps 105 to 150, including at least the positioning at 115, the compressing at 120, and the welding at 130, together may be referred to herein as methods of forming a FRTCSM, such as FRTCSM 20, and/or as methods of forming the FRTCSM from the first thermoplastic sub-structure and the second thermoplastic sub-structure. When methods 100 also include the attaching at 155, such as when methods 100 include at least the positioning at 115, the compressing at 120, the welding at 130, and the attaching at 155, methods 100 may be referred to herein as methods of forming an aircraft, such as aircraft 10.

Providing the thermoplastic sub-structure at 105 may include providing the first thermoplastic sub-structure and/or the second thermoplastic sub-structure in any suitable manner. As examples, the providing at 105 may include forming and/or defining the first thermoplastic sub-structure and/or the second thermoplastic sub-structure, such as via automated fiber placement, continuous compression molding, flat blank layup, and/or stamp forming. The providing at 105 may include providing the first thermoplastic sub-structure and/or the second thermoplastic sub-structure in consolidated or unconsolidated form.

The providing at 105 may be performed with any suitable timing and/or sequence during methods 100. As examples, the providing at 105 may be performed prior to and/or at least partially concurrently with the positioning at 110, the positioning at 115, the compressing at 120, the thermally protecting at 125, the welding at 130, the providing at 135, the positioning at 140, the compressing at 145, the welding at 150, and/or the attaching at 155.

Positioning the joining layer at 110 may include positioning the joining layer between the first web and the second web. In some examples, the positioning at 110 may include positioning a separate and/or distinct joining layer between the first web and the second web. Additionally or alternatively, and in some examples, the positioning the joining layer may include forming and/or defining the joining layer on any suitable region and/or surface of the first thermoplastic sub-structure and/or of the second thermoplastic sub-structure, such as on the first web, on the second web, on the first flange, and/or on the second flange. Stated differently, the joining layer may form and/or define an external surface of the first thermoplastic sub-structure and/or of the second thermoplastic sub-structure, such as during the providing at 105. In such examples, the positioning at 115 may cause the joining layer to be positioned between the first we and the second web.

Examples of the joining layer are illustrated in FIGS. 3-15 and indicated at 80. As illustrated therein, the joining layer may include and/or may be defined by a joining layer thermoplastic resin 82.

The positioning at 110 may be performed with any suitable timing and/or sequence during methods 100. As examples, the positioning at 110 may be performed subsequent to and/or at least partially concurrently with the providing at 105 and/or the positioning at 115. As additional examples, the positioning at 110 may be performed prior to and/or at least partially concurrently with positioning at 115, the compressing at 120, the thermally protecting at 125, the welding at 130, the providing at 135, the positioning at 140, the compressing at 145, the welding at 150, and/or the attaching at 155.

Positioning thermoplastic sub-structures at 115 may include positioning the first thermoplastic sub-structure and the second thermoplastic sub-structure relative to one another. This may include positioning such that the first flange extends away from the second flange, such that the first flange extends away from the second thermoplastic sub-structure, such that the second flange extends away from the first flange, such that the second flange extends away from the first thermoplastic sub-structure, such that the first web faces the second web, and/or such that the first transition region faces the second transition region.

In some examples, the positioning at 115 may include positioning the first thermoplastic sub-structure and the second thermoplastic sub-structure such that a first flange surface of the first flange extends parallel, or at least substantially parallel, to a second flange surface of the second flange and/or such that the first flange surface is coplanar, or at least substantially coplanar, with the second flange surface. Stated differently, the first flange surface and the second flange surface may define a flange surface angle of, or of approximately, 180 degrees. However, this is not required, and it is within the scope of the present disclosure that the first flange surface and the second flange surface may define an acute flange surface angle and/or an obtuse flange surface angle. Examples of the first flange surface are illustrated in FIGS. 3-18 and indicated at 42 in FIGS. 3-6. Examples of the second flange surface are illustrated in FIGS. 3-18 and indicated at 62 in FIGS. 3-6. An example of the flange surface angle is illustrated in FIG. 4 and indicated at 70.

Figure 3:
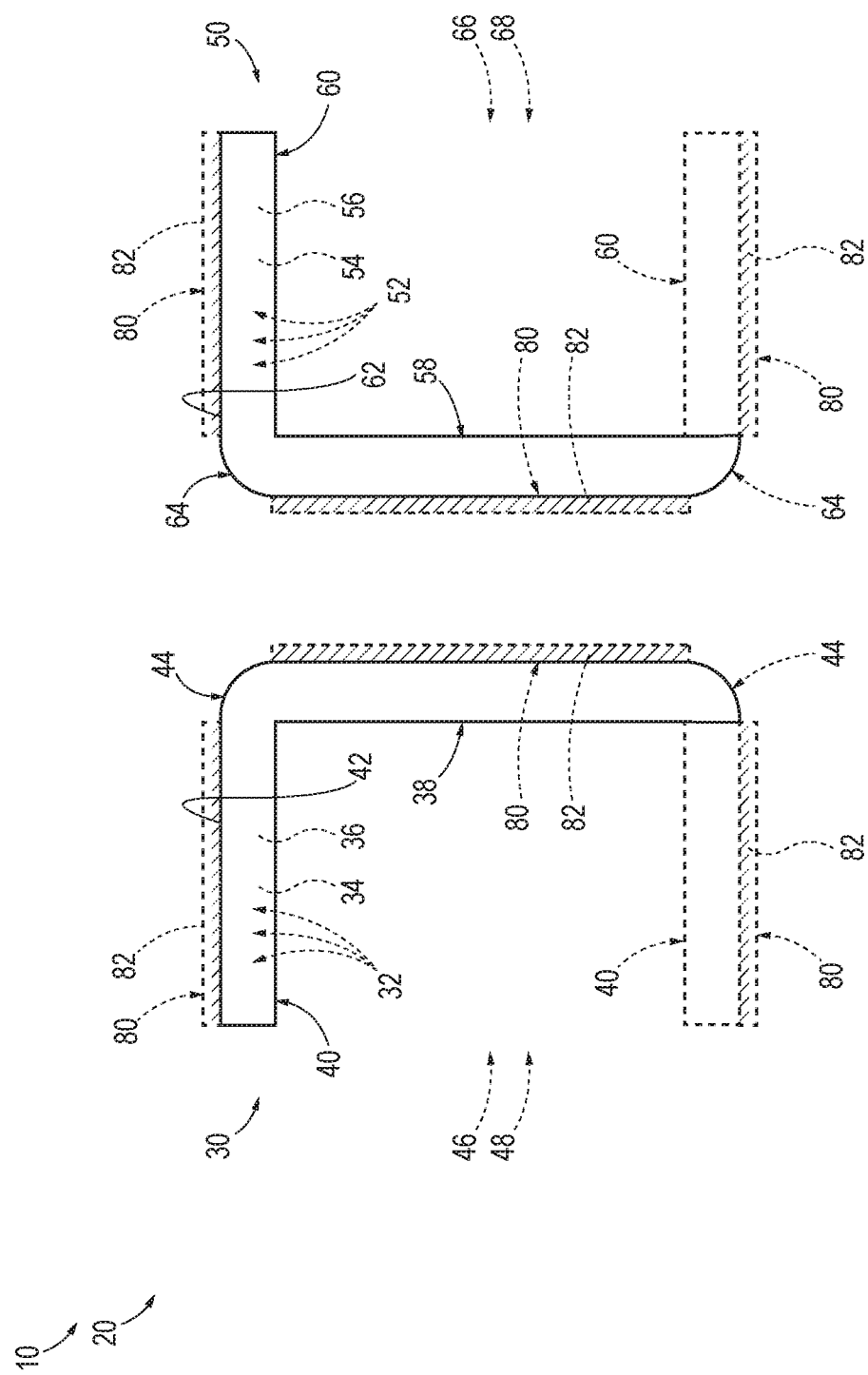
FIG. 3 is a schematic illustration of an example of a portion of the methods of FIG. 2.
Figure 4:
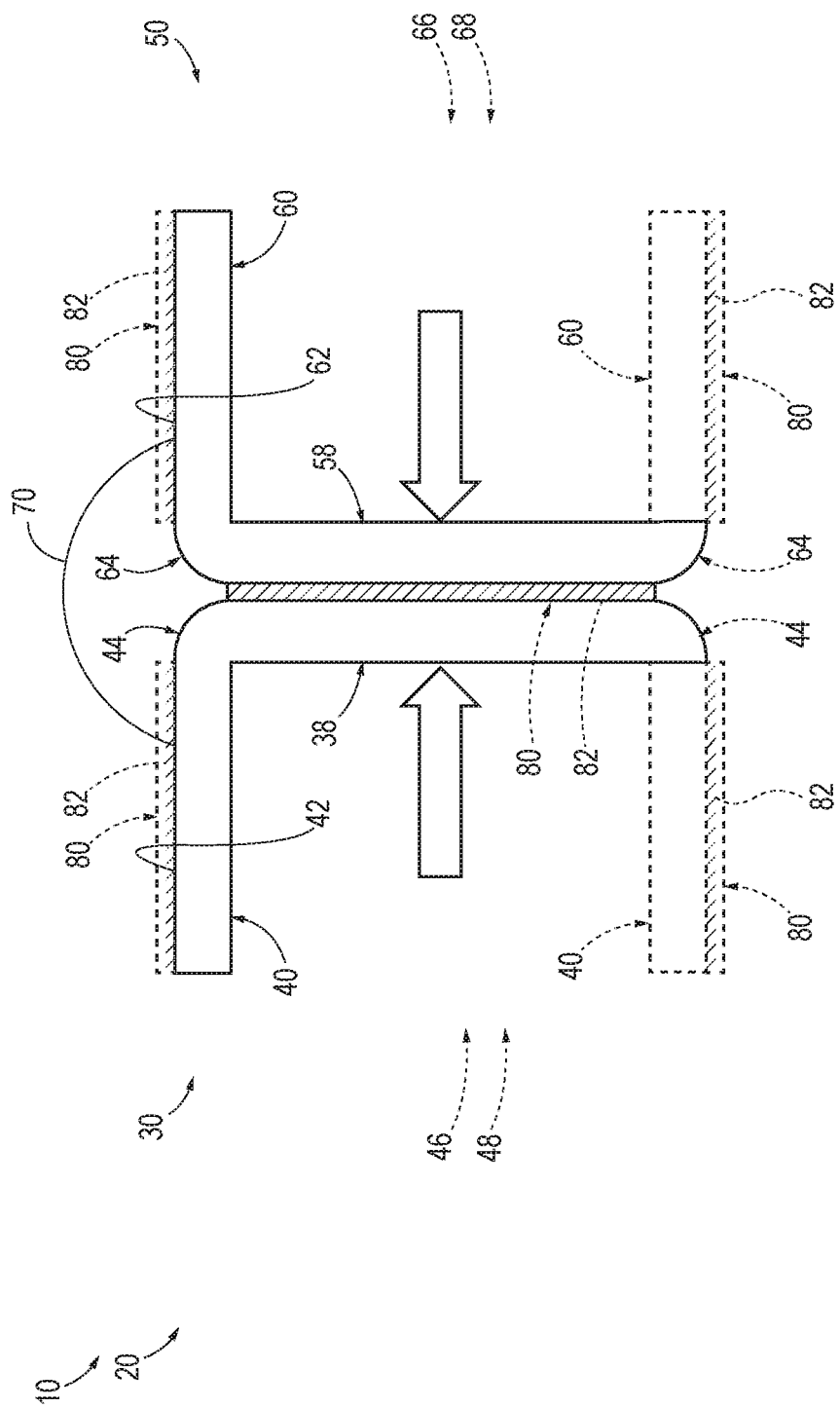
FIG. 4 is a schematic illustration of an example of a portion of the methods of FIG. 2.

An example of the positioning at 115 is illustrated in FIG. 3, which is a transverse cross-sectional view of first thermoplastic sub-structure 30 and second thermoplastic sub-structure 50. As illustrated therein, the positioning at 115 may include positioning first thermoplastic sub-structure 30 and second thermoplastic sub-structure 50 relative to one another and such that first web 38, or a surface of first web 38, faces toward second web 58, or toward a surface of second web 58. FIG. 3 also illustrates the positioning at 110 in dashed lines, with joining layer 80 being positioned between first web 38 and second web 58.

The positioning at 115 may be performed with any suitable timing and/or sequence during methods 100. As examples, the positioning at 115 may be performed subsequent to and/or at least partially concurrently with the providing at 105 and/or the positioning at 110. As additional examples, the positioning at 115 may be performed prior to and/or at least partially concurrently with the positioning at 110, the compressing at 120, the thermally protecting at 125, the welding at 130, and/or the attaching at 155. As further examples, the positioning at 115 may be performed prior to, at least partially concurrently with, and/or subsequent to the providing at 135, the positioning at 140, the compressing at 145, and/or the welding at 150.

Compressing webs at 120 may include compressing the first web and the second web together, such as to permit and/or to facilitate the welding at 130. This may be performed in any suitable manner. As examples, the compressing at 120 may include applying a compression force to press the first web and the second web together, establishing direct, face-to-face contact between the first web and the second web, establishing an interface region between the first web and the second web, and/or establishing indirect contact between the first web and the second web, such as via the joining layer. In more specific examples, the compressing at 120 may include utilizing any suitable compression structure, examples of which include a press, a hydraulic press, a pneumatic press, a mechanical press, a mandrel, an outer mold line mandrel, a plate, a surface, a continuous press process, a continuous rolling press, a batch press process, and/or a semi-batch press process to compress the first web and the second web together.

The compressing at 120 is illustrated in FIG. 4 and indicated by the horizontally facing arrows. The horizontally facing arrows may indicate a compressive force applied to first web 38 and to second web 58, such as via the compression structure.

The compressing at 120 may be performed with any suitable timing and/or sequence during methods 100. As examples, the compressing at 120 may be performed subsequent to and/or at least partially concurrently with the providing at 105, the positioning at 110, and/or the positioning at 115. As additional examples, the compressing at 120 may be performed prior to and/or at least partially concurrently with the thermally protecting at 125, the welding at 130, and/or the attaching at 155. As further examples, the compressing at 120 may be performed prior to, at least partially concurrently with, and/or subsequent to the providing at 135, the positioning at 140, the compressing at 145, and/or the welding at 150.

Thermally protecting at 125 may include controlling and/or regulating a temperature of at least one region of the first thermoplastic sub-structure and/or of the second thermoplastic sub-structure, such as during the welding at 130. This may include controlling and/or regulating the temperature of the at least one region to decrease a potential for damage to, deformation of, and/or melting of the at least one region prior to, during, and/or subsequent to the welding at 130. Stated differently, and as discussed in more detail herein, the welding at 130 may include increasing a temperature of the first web and/or of the second web, and the thermally protecting at 125 may be performed to maintain an overall shape of the first thermoplastic sub-structure and/or of the second thermoplastic sub-structure during the welding at 130, such as via protecting the first thermoplastic substructure and/or the second thermoplastic substructure from thermal deformation. Stated differently, and during the welding at 130, the thermally protecting at 125 may include maintaining the first flange and the first transition region below a melt temperature of the first thermoplastic substructure and/or maintaining the second flange and the second transition region below a melt temperature of the second thermoplastic sub-structure. As such, the overall shape of the first thermoplastic sub-structure and/or of the second thermoplastic sub-structure may be maintained.

The thermally protecting at 125 may be performed in any suitable manner. This may include any suitable active and/or passive mechanism that may be utilized to control and/or regulate the temperature of the at least one region of the first thermoplastic sub-structure and/or of the second thermoplastic sub-structure. As examples, the thermally protecting at 125 may include thermally isolating the first flange from the first web, thermally isolating the first transition region from the first web, thermally isolating the second flange from the second web, and/or thermally isolating the second transition region from the second web. This may include thermally isolating with, via, and/or utilizing a thermally isolating material, such as a thermal insulator.

As additional examples, the thermally protecting at 125 may include actively cooling at least one region of the first thermoplastic sub-structure and/or of the second thermoplastic sub-structure, such as the first flange, the first transition region, the second flange, and/or the second transition region. The actively cooling may include actively cooling with, via, and/or utilizing any suitable mechanism, examples of which include a contained coolant fluid stream, an air stream, and/or a cooling fixture.

As further examples, the thermally protecting at 125 may include conducting heat away from the at least one region of the first thermoplastic sub-structure and/or of the second thermoplastic sub-structure. This may include contacting the at least one region with a heat sink structure, conducting heat from the at least one region into the heat sink structure, and/or cooling the heat sink structure. Examples of the heat sink structure include a thermally conductive material, a metal, a fin, a pin, a fan, a Peltier device, and/or a heat exchanger.

The thermally protecting at 125 may be performed with any suitable timing and/or sequence during methods 100. As examples, the thermally protecting at 125 may be performed subsequent to and/or at least partially concurrently with the providing at 105, the positioning at 110, the positioning at 115, the compressing at 120, and/or the welding at 130. As additional examples, the thermally protecting at 125 may be performed prior to, at least partially concurrently with, and/or subsequent to the welding at 130, the providing at 135, the positioning at 140, the compressing at 145, and/or the welding at 150.

Welding the webs at 130 may include welding the first web and the second web to one another to at least partially define the FRTCSM. This may include increasing a temperature of the first web to at least partially melt the first web and/or increasing a temperature of the second web to at least partially melt the second web, thereby causing the first web and the second web to fuse together. The welding at 130 also may be referred to herein as thermoplastically welding and/or fusing.

The welding at 130 may be performed in any suitable manner, utilizing any suitable process, and/or utilizing any suitable structure. As examples, the welding at 130 may include induction welding the first web and the second web to one another, conduction welding the first web and the second web to one another, resistance welding the first web and the second web to one another, laser welding the first web and the second web to one another, and/or ultrasonic welding the first web and the second web to one another.

In some examples, the welding at 130 may include simultaneously welding an entire length of the first web to the second web. Alternatively, and in some examples, the welding at 130 may include progressively welding a length, or an entire length, of the first web to the second web. This may include operatively translating a welding structure, which is configured to perform the welding the first web and the second web to one another, relative to the first thermoplastic sub-structure and the second thermoplastic sub-structure and/or operatively translating the first thermoplastic sub-structure and the second thermoplastic sub-structure relative to the welding structure.

In some examples, the welding at 130 may include welding at least a threshold surface area fraction of a contact surface area between the first web and the second web. Examples of the threshold surface area fraction include 20%, 30%, 40%, 50%, 60%, 70%, at 80%, 90%, 95%, or 99%.

When methods 100 include the positioning at 110, the welding at 130 may include melting the joining layer. The joining layer may include and/or define a thermoplastic resin which may be and/or include a first thermoplastic resin, a second thermoplastic resin, and joining layer thermoplastic resin. In such examples, the first thermoplastic resin may define a first thermoplastic resin melt temperature, the second thermoplastic resin may define a second thermoplastic resin melt temperature, and the joining layer thermoplastic resin may define a joining layer thermoplastic resin melt temperature that is less than the first thermoplastic resin melt temperature and less than the second thermoplastic resin melt temperature. As such, the melting the joining layer may include heating the joining layer to a joining layer temperature that is greater than the joining layer thermoplastic resin melt temperature and less than both the first thermoplastic resin melt temperature and the second thermoplastic resin melt temperature. Stated differently, the welding at 130 may include melting the joining layer without melting the first thermoplastic sub-structure and without melting the second thermoplastic sub-structure.

Figure 5:
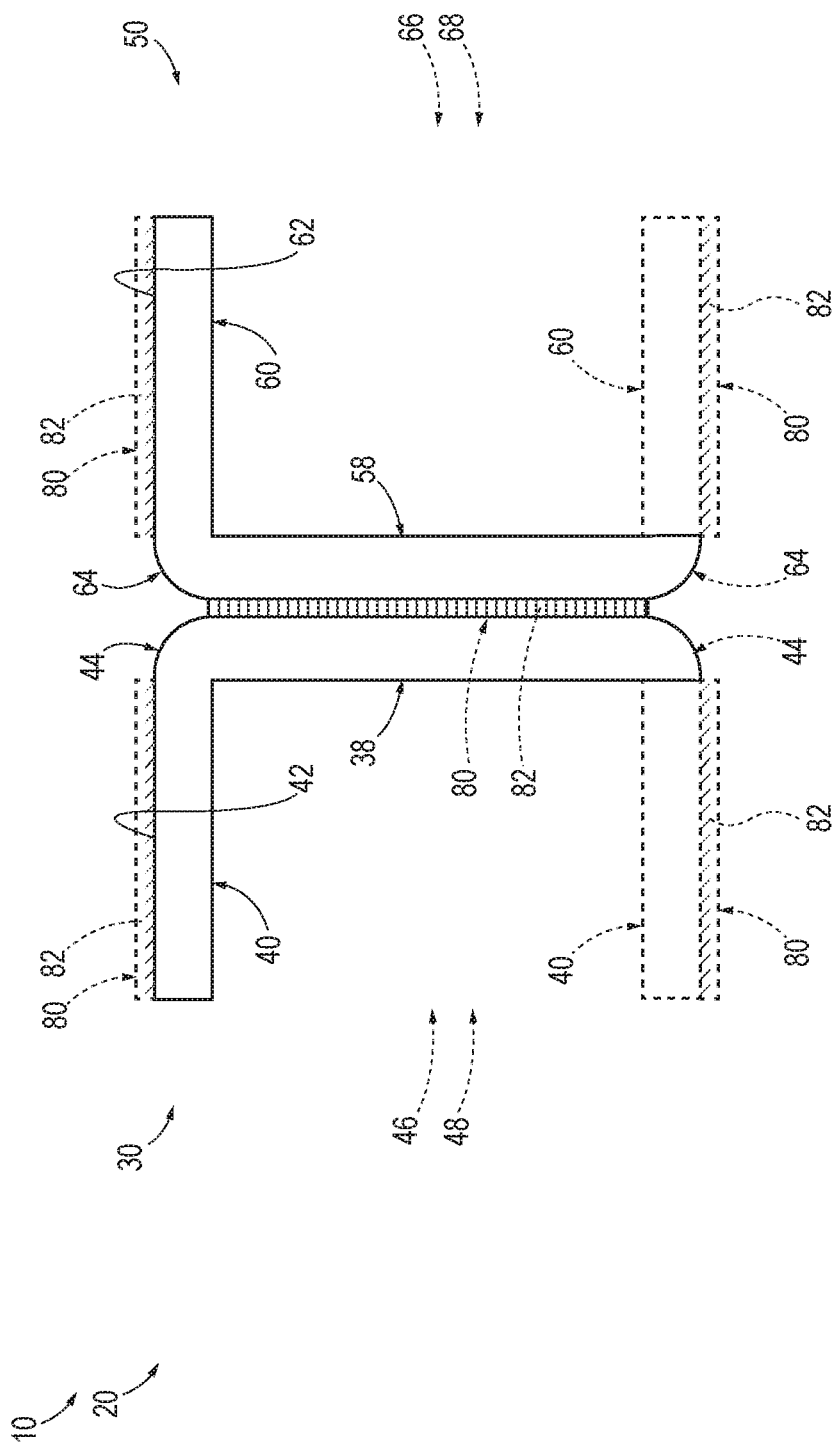
FIG. 5 is a schematic illustration of an example of a portion of the methods of FIG. 2.

The welding at 130 is illustrated by the transition from the configuration that is illustrated in FIG. 4 to the configuration that is illustrated in FIG. 5. In particular, FIG. 4 illustrates first thermoplastic sub-structure 30 and second thermoplastic sub-structure 50 during the compressing at 120 and prior to the welding at 130. In FIG. 4, the interface region between first thermoplastic sub-structure 30 and second thermoplastic sub-structure 50 is illustrated in dashed lines to indicate that the two structures have not yet been welded together. In contrast, FIG. 5 illustrates the interface region in solid horizontal lines to indicate that the first thermoplastic sub-structure and the second thermoplastic sub-structure have been welded together.

The welding at 130 may be performed with any suitable timing and/or sequence during methods 100. As examples, the welding at 130 may be performed subsequent to and/or at least partially concurrently with the providing at 105, the positioning at 110, the positioning at 115, the compressing at 120, and/or the thermally protecting at 125. As additional examples, the welding at 130 may be performed prior to the attaching at 155. As further examples, the welding at 130 may be performed prior to, at least partially concurrently with, and/or subsequent to the providing at 135, the positioning at 140, the compressing at 145, and/or the welding at 150.

Proving the cap sub-structure at 135 may include providing any suitable cap sub-structure in any suitable manner. As examples, the providing at 135 may include forming and/or defining the cap sub-structure in a manner that may be at least substantially similar to the providing at 105. This may include providing the cap sub-structure in consolidated or unconsolidated form.

The providing at 135 may be performed with any suitable timing and/or sequence during methods 100. As examples, the providing at 135 may be performed prior to and/or at least partially concurrently with the positioning at 140, the compressing at 145, the welding at 150, and/or the attaching at 155. As additional examples, the providing at 135 may be performed prior to, at least partially concurrently with, and/or subsequent to the providing at 105, the positioning at 110, the positioning at 115, the compressing at 120, the thermally protecting at 125, and/or the welding at 130.

Positioning the cap sub-structure at 140 may include positioning the cap sub-structure relative to the first thermoplastic sub-structure and/or relative to the second thermoplastic sub-structure. This may include positioning the cap sub-structure such that the cap sub-structure faces the first flange and/or faces the second flange.

Figure 6:
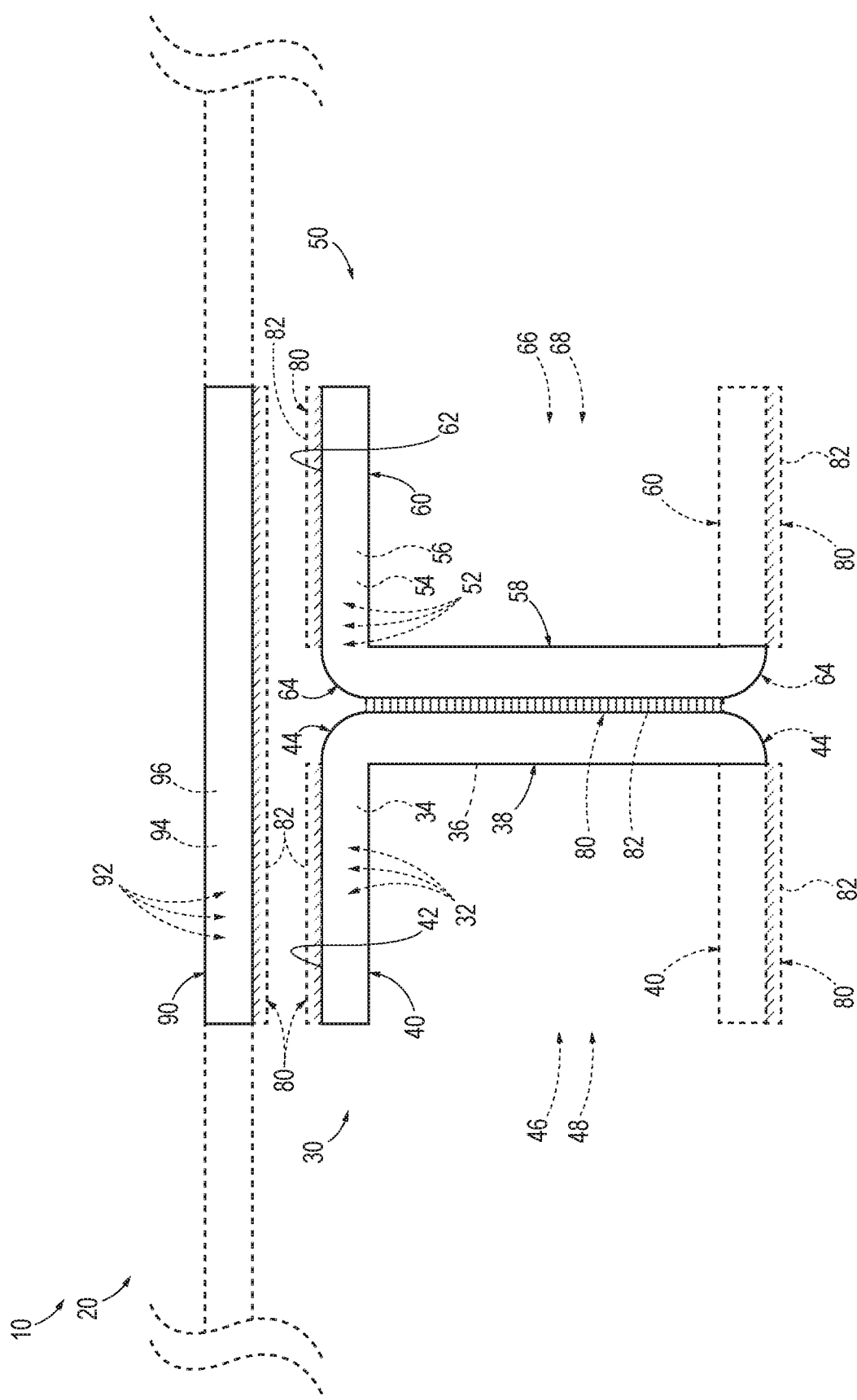
FIG. 6 is a schematic illustration of an example of a portion of the methods of FIG. 2.

The positioning at 140 is illustrated in FIG. 6. As illustrated therein, a cap sub-structure 90 is positioned, relative to first thermoplastic sub-structure 30 and also relative to second thermoplastic sub-structure 50. This positioning is such that cap sub-structure 90, or a surface of cap sub-structure 90, faces toward first flange 40, faces toward first flange surface 42, faces toward second flange 60, and/or faces toward second flange surface 62.

It is within the scope of the present disclosure that the cap sub-structure may be shaped, sized, and/or configured to contact, to form a direct face-to-face contact with, and/or to form an indirect contact, such as via a corresponding joining layer 80, with first flange 40, with first flange surface 42, with second flange 60, and/or with second flange surface 62. With this in mind, and in some examples, a shape of the cap sub-structure may correspond to, be the same as, or be at least substantially the same as a composite flange shape of a combination of the first flange and the second flange, as illustrated in solid lines in FIG. 6. Stated differently, a width of the cap sub-structure may correspond to, or be at least substantially equal to, a width of the composite flange shape and/or a length of the cap sub-structure may correspond to, or be at least substantially equal to, a length of the composite flange shape. In such a configuration, FRTCSM 20 may form and/or define a composite beam.

Additionally or alternatively, and in some examples, the cap sub-structure may be significantly larger than the composite flange shape and/or may extend past the composite flange shape, as illustrated in dashed lines in FIG. 6. In such a configuration, FRTCSM 20 may form and/or define an integrated structure, such as torsion box 16 and/or pressure deck 18, which are discussed in more detail herein. Stated differently, the cap sub-structure may include and/or be a skin, or an exterior surface, of aircraft 10, and the first thermoplastic sub-structure and the second thermoplastic sub-structure may be welded to the skin of aircraft 10.

When methods 100 include the positioning at 140, methods 100 also may include repeating the positioning at 110, such as to position the joining layer between the cap sub-structure and the first flange and/or to position the joining layer between the cap sub-structure and the second flange. This is illustrated in FIG. 6, with joining layer 80, which is illustrated in dashed lines, being positioned between cap sub-structure 90 and first flange 40 and/or second flange 60.

The positioning at 140 may be performed with any suitable timing and/or sequence during methods 100. As examples, the positioning at 140 may be performed subsequent to and/or at least partially concurrently with the providing at 135. As additional examples, the positioning at 140 may be performed prior to and/or at least partially concurrently with the compressing at 145, the welding at 150, and/or the attaching at 155. As further examples, the positioning at 140 may be performed prior to, at least partially concurrently with, and/or subsequent to the providing at 105, the positioning at 110, the positioning at 115, the compressing at 120, the thermally protecting at 125, and/or the welding at 130.

Compressing the cap sub-structure at 145 may include compressing the cap sub-structure to the first flange and to the second flange, such as to permit and/or to facilitate the welding at 150. This may be performed in a manner that may be similar, or at least substantially similar, to the compressing at 120.

Figure 7:
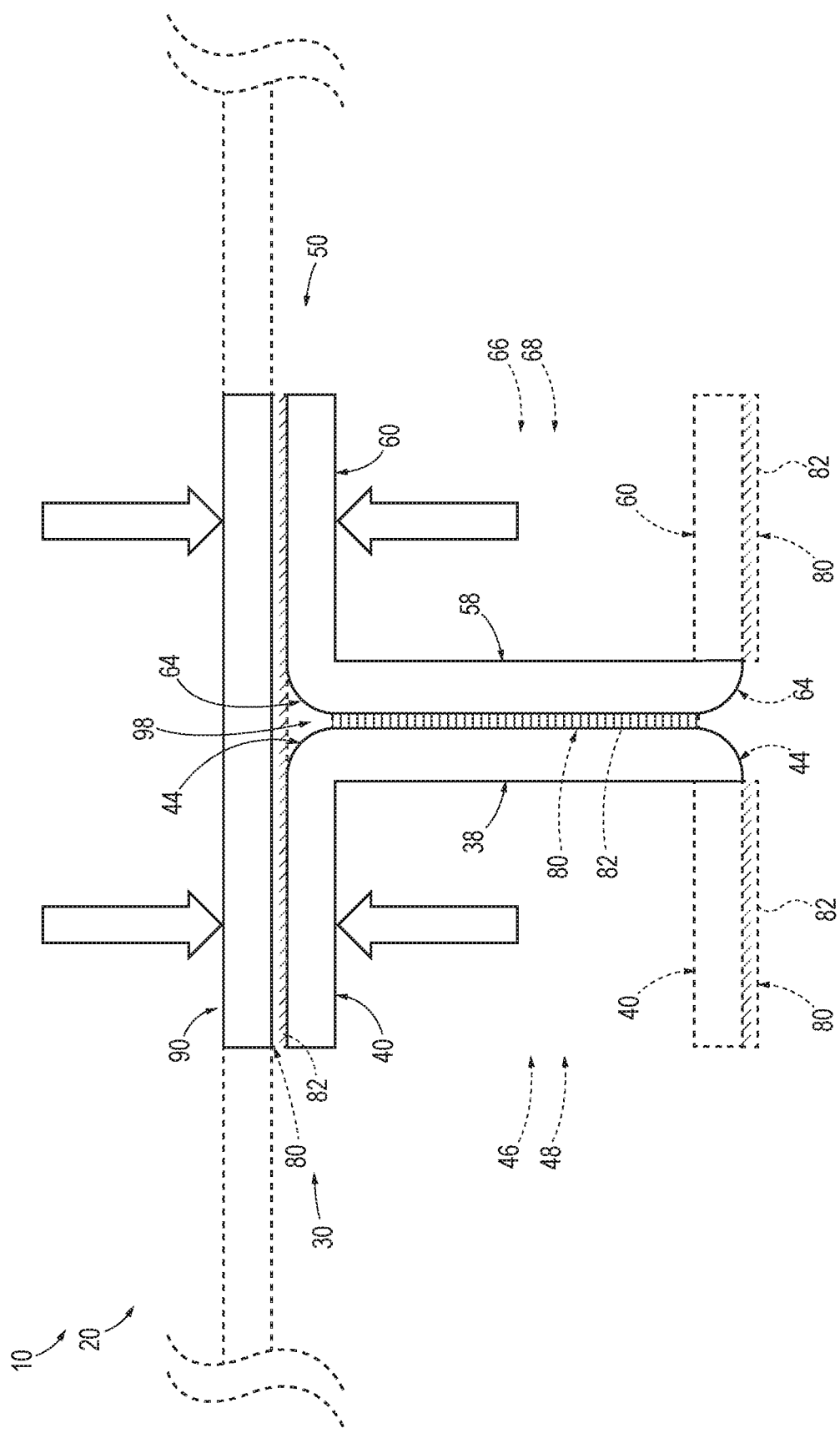
FIG. 7 is a schematic illustration of an example of a portion of the methods of FIG. 2.

The compressing at 145 is illustrated in FIG. 7 by the vertically facing arrows. The vertically facing arrows may indicate a compressive force that is applied to cap sub-structure 90 and to first flange 40 and/or to cap sub-structure 90 and second flange 60, such as via any suitable compression structure, examples of which are disclosed herein.

The compressing at 145 may be performed with any suitable timing and/or sequence during methods 100. As examples, the compressing at 145 may be performed subsequent to and/or at least partially concurrently with the providing at 135 and/or the positioning at 140. As additional examples, the compressing at 147 may be performed prior to and/or at least partially concurrently with the welding at 150 and/or the attaching at 155. As further examples, the compressing at 145 may be performed prior to, at least partially concurrently with, and/or subsequent to the providing at 105, the positioning at 110, the positioning at 115, the compressing at 120, the thermally protecting at 125, and/or the welding at 130.

Welding the cap sub-structure at 150 may include welding the cap sub-structure to the first flange and/or welding the cap sub-structure to the second flange. The welding at 150 may be at least substantially similar to the welding at 130, which is discussed in more detail herein. This may include welding at least a threshold surface area fraction of contact surface area between the cap sub-structure and the first flange surface and/or the second flange surface, and examples of the threshold surface area fraction are disclosed herein.

It is within the scope of the present disclosure that the welding at 150 may include simultaneously, or at least partially simultaneously, welding the cap sub-structure to the first flange and to the second flange. Such a configuration may decrease a time required to perform the welding at 150. Alternatively, the welding at 150 may include initially welding the cap sub-structure to one of the first flange and the second flange and subsequently welding the cap sub-structure to the other of the first flange and the second flange. Such a configuration may decrease overall heating of the cap sub-structure, the first flange, the first transition region, the second flange, and/or the second transition region, thereby decreasing a potential for deformation of the cap sub-structure, the first flange, the first transition region, the second flange, and/or the second transition region.

Figure 8:
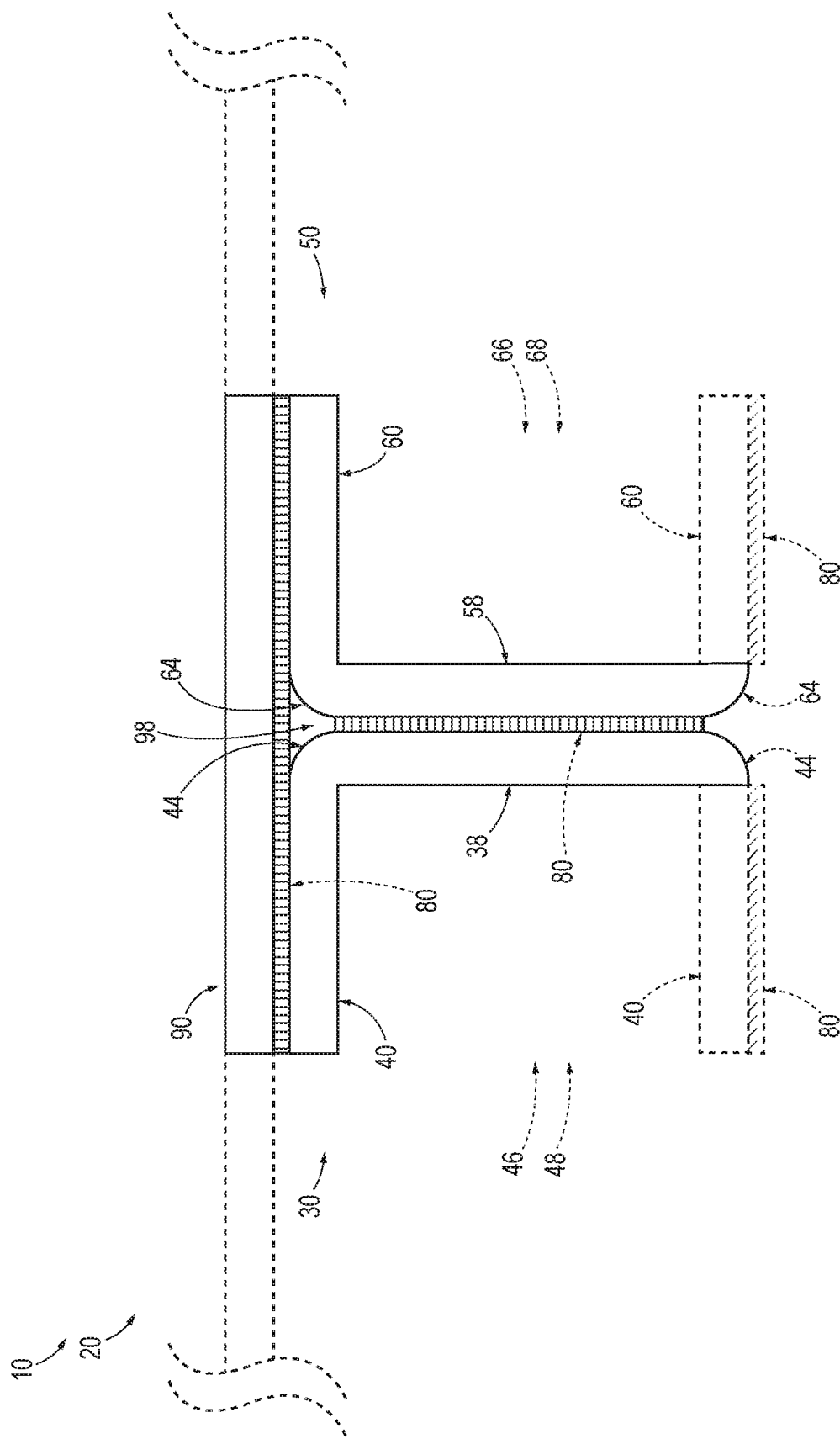
FIG. 8 is a schematic illustration of an example of a portion of the methods of FIG. 2.

The welding at 150 is illustrated by the transition from the configuration that is illustrated in FIG. 7 to the configuration that is illustrated in FIG. 8. In particular, FIG. 7 illustrates first flange 40, second flange 60, and cap sub-structure 90 during the compressing at 145 and prior to the welding at 150. In FIG. 7, the interface region between first flange 40 and cap sub-structure 90 and the interface region between second flange 60 and cap sub-structure 90 are illustrated in dashed lines to indicate that the structures have not yet been welded together. In contrast, FIG. 8 illustrates the interface region in solid vertical lines to indicate that cap sub-structure 90 has been welded to first flange 40 and to second flange 60.

As illustrated in FIG. 8, the welding at 150 may include forming, defining, and/or establishing an elongate void space 98. Elongate void space 98 may extend along a length of FRTCSM 20 and/or may be at least partially bounded by first transition region 44, second transition region 64, and cap sub-structure 90. As illustrated, elongate void space 98 may be open and/or void of any structure. Stated differently, elongate void space 98 may be free of a composite radius filler, which may be required when conventional fabrication techniques are utilized to form and/or define conventional fiber-reinforced thermoplastic composite structures.

The welding at 150 may be performed with any suitable timing and/or sequence during methods 100. As examples, the welding at 150 may be performed subsequent to the providing at 135, the positioning at 140, and/or the compressing at 145. As another example, the welding at 150 may be performed prior to the attaching at 155. As further examples, the welding at 150 may be performed prior to, at least partially concurrently with, and/or subsequent to the providing at 105, the positioning at 110, the positioning at 115, the compressing at 120, the thermally protecting at 125, and/or the welding at 130. In a specific example, methods 100 may include performing, or continuing to perform, the thermally protecting at 125 during the welding at 150, such as to decrease a potential for deformation of the cap sub-structure, the first thermoplastic sub-structure, and/or the second thermoplastic sub-structure during the welding at 150.

In some examples, and as illustrated in FIGS. 3-8 and 11-18, first thermoplastic sub-structure 30 may include a pair of first flanges 40, with each first flange 40 extending away from a corresponding side of first web 38, such as via a corresponding first transition region 44. Additionally or alternatively, and as also illustrated, second thermoplastic sub-structure 30 may include a pair of second flanges 60, with each second flange 60 extending away from a corresponding side of second web 58, such as via a corresponding second transition region 64.

Figure 11:
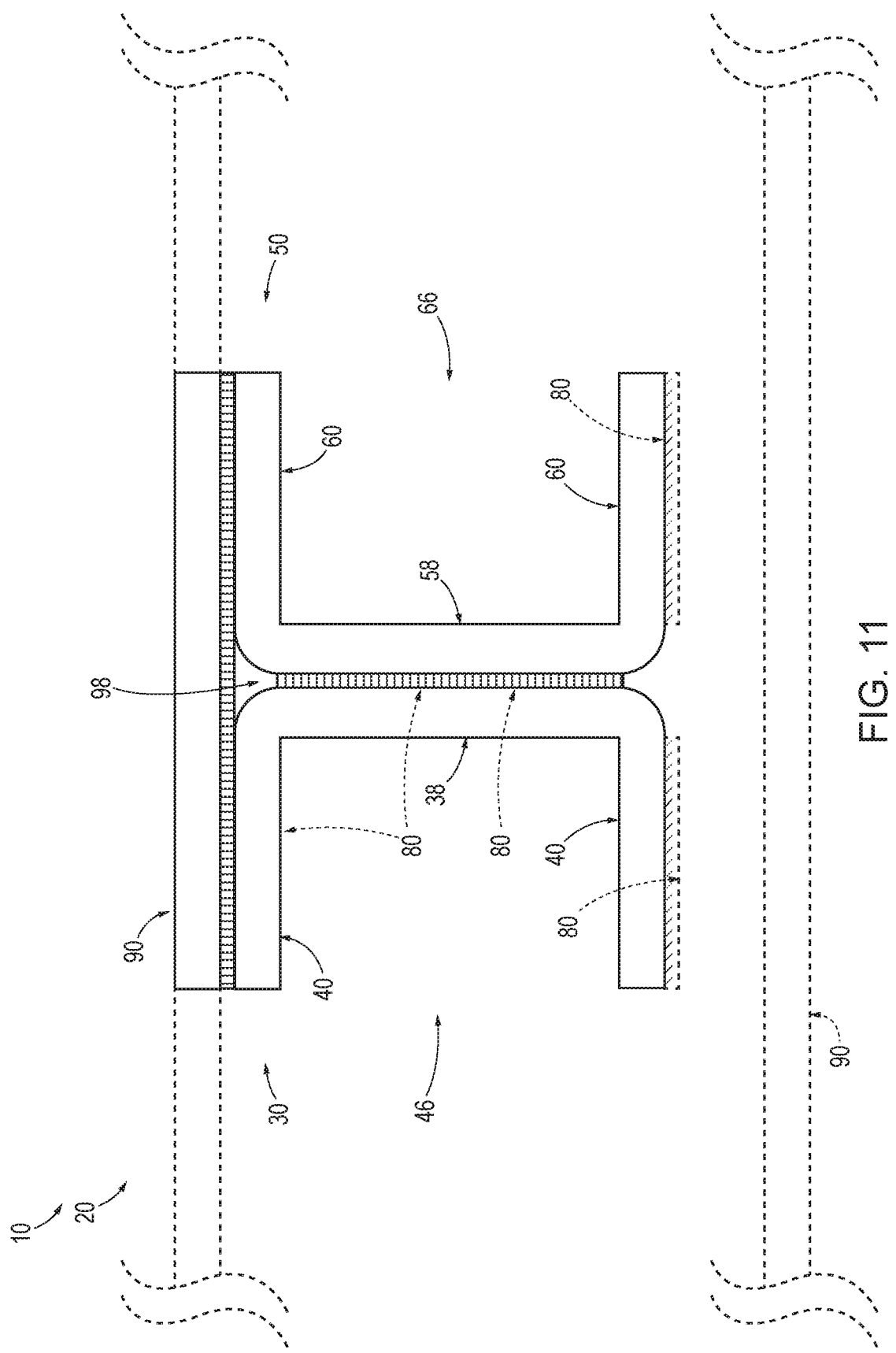
FIG. 11 is a schematic illustration of an example of a portion of the methods of FIG. 2.
Figure 12:
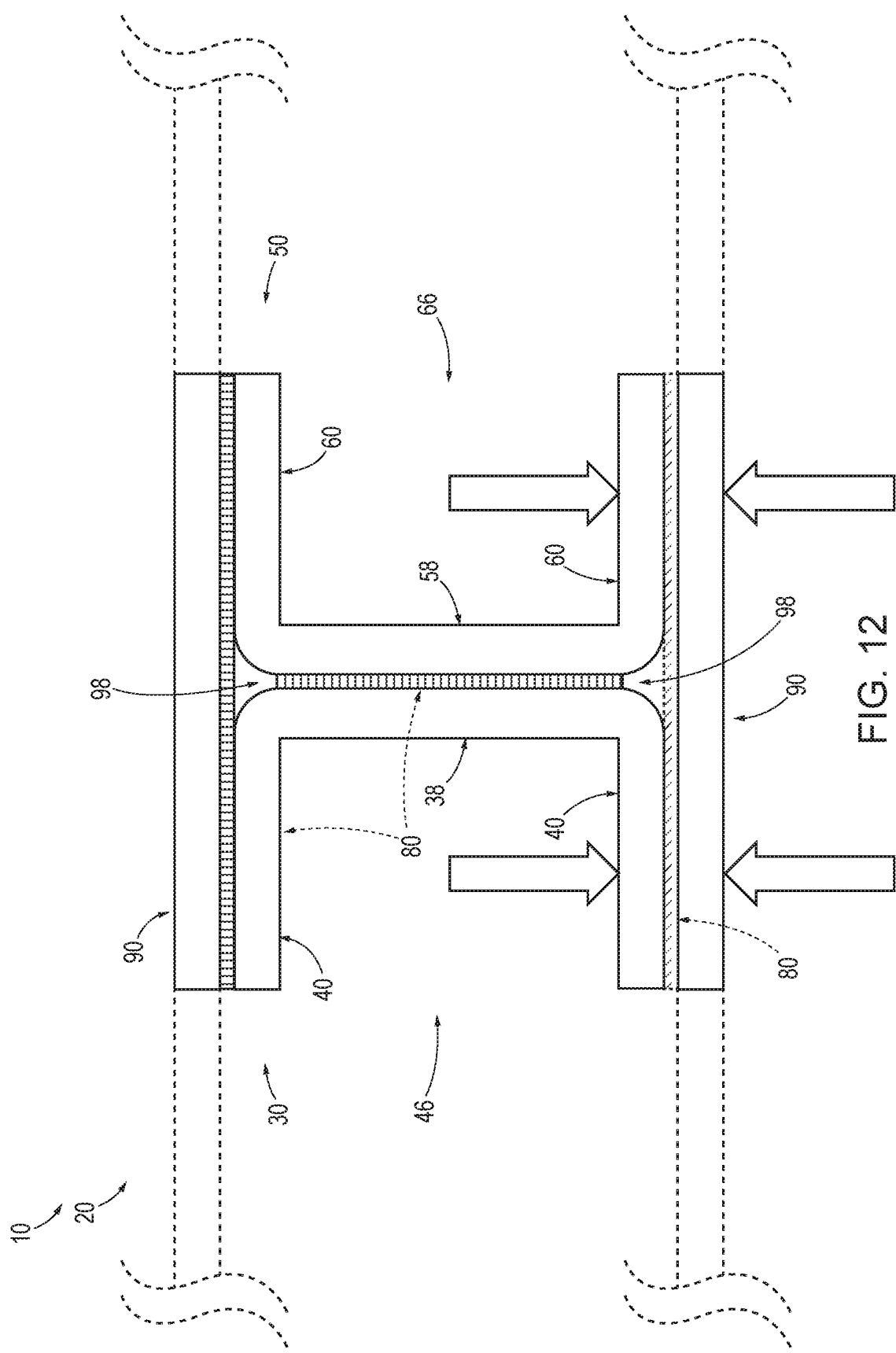
FIG. 12 is a schematic illustration of an example of a portion of the methods of FIG. 2.
Figure 13:
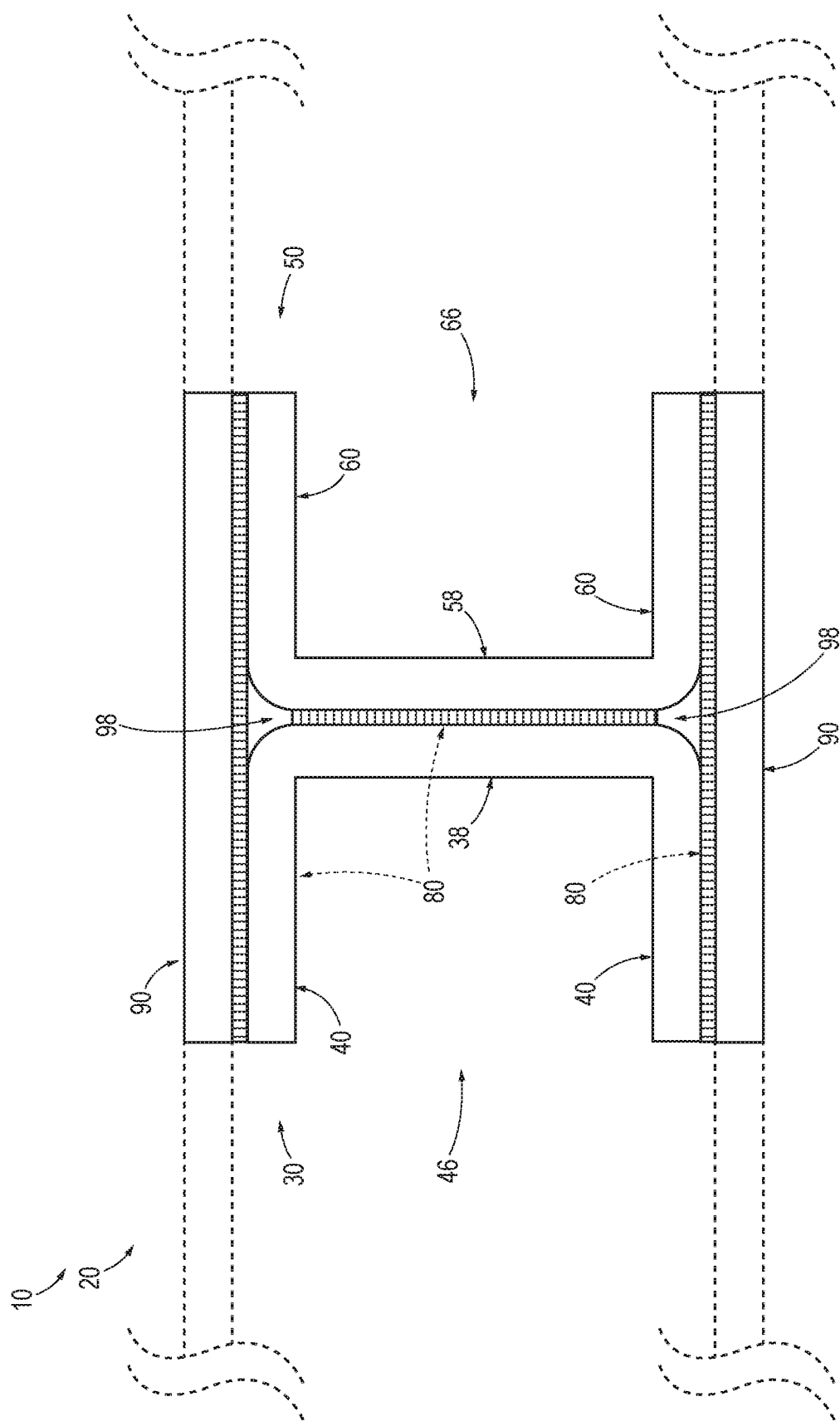
FIG. 13 is a schematic illustration of an example of a portion of the methods of FIG. 2.

In some such examples, and as illustrated in FIGS. 11-18, FRTCSM 20 may include a pair of cap sub-structures 90. In such a configuration, the positioning at 135 may include positioning each cap sub-structure 90 relative a corresponding first flange 40 of the pair of first flanges 40 and also relative to a corresponding second flange 60 of the pair of second flanges 60 such that each cap sub-structure 90 faces the corresponding first flange 40 and the corresponding second flange 60. This is illustrated in FIG. 11. In addition, the compressing at 145 may include compressing each cap sub-structure 90 to the corresponding first flange 40 and to the corresponding second flange 60. This is illustrated in FIG. 12. Furthermore, the welding at 150 may include welding each cap sub-structure 90 to the corresponding first flange 40 and to the corresponding second flange 60. This is illustrated by the transition to the configuration that is illustrated in FIG. 12 to the configuration that is illustrated in FIGS. 13-15.

The first thermoplastic sub-structure, the second thermoplastic sub-structure, and/or the cap sub-structure may include any suitable material and/or materials. As an example, the first thermoplastic sub-structure may include a first thermoplastic resin, such as is indicated at 34 in FIG. 3, the second thermoplastic sub-structure may include a second thermoplastic resin, such as is indicated at 54 in FIG. 3, and/or the cap sub-structure may include a cap thermoplastic resin, such as is indicated at 94 in FIG. 6. In some such examples, the first thermoplastic resin, the second thermoplastic resin, and/or the cap thermoplastic resin may include and/or be the same thermoplastic resin. Stated differently, the first thermoplastic sub-structure, the second thermoplastic sub-structure, and/or the cap sub-structure may include the same thermoplastic resin. In other examples, at least one of the first thermoplastic resin, the second thermoplastic resin, and the cap thermoplastic resin may differ from, and be compatible with, at least one other of the first thermoplastic resin, the second thermoplastic resin, and the cap thermoplastic resin.

As another example, the first thermoplastic sub-structure may include a first fiber material, such as is indicated at 36 in FIG. 3, the second thermoplastic sub-structure may include a second fiber material, such as is indicated at 56 in FIG. 3, and/or the cap sub-structure may include a cap fiber material such as is indicated at 96 in FIG. 6. In some such examples, the first fiber material, the second fiber material, and/or the third fiber material may include and/or be the same fiber material. Stated differently, the first thermoplastic sub-structure, the second thermoplastic substructure, and/or the cap sub-structure may include the same fiber material. In other examples, at least one of the first fiber material, the second fiber material, and the cap fiber material may differ from at least one other of the first fiber material, the second fiber material, and the cap fiber material. An example of the first fiber material, the second fiber material, and/or the cap fiber material includes carbon fibers. In some examples, the first fiber material, the second fiber material, and/or the third fiber material may include a plurality of different types, classes, sizes, and/or chemistries of fiber material.

As another example, the first thermoplastic sub-structure may include a plurality of first plies of composite material, such as is indicated at 32 in FIG. 3, the second thermoplastic sub-structure may include a plurality of second plies of composite material, such as is indicated at 52 in FIG. 3, and/or the cap sub-structure may include a plurality of cap plies of composite material, as indicated at 92 in FIG. 6. In some such examples, the plurality of first plies of composite material may be defined by the first thermoplastic resin and the first fiber material, the plurality of second plies of composite material may be defined by the second thermoplastic resin and the second fiber material, and/or the plurality of cap plies of composite material may be defined by the cap thermoplastic resin and the cap fiber material.

Figure 16:
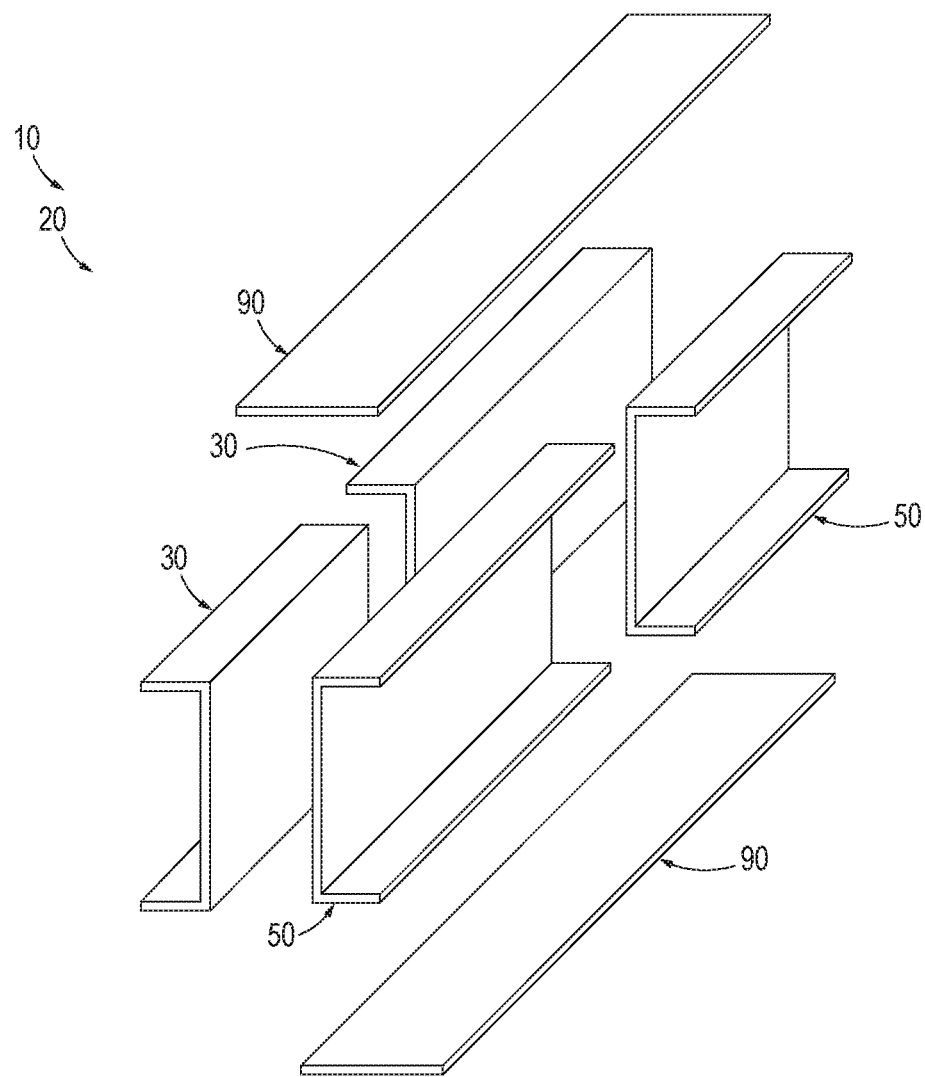
FIG. 16 is an exploded view of a fiber-reinforced thermoplastic composite structural member according to the present disclosure.
Figure 17:
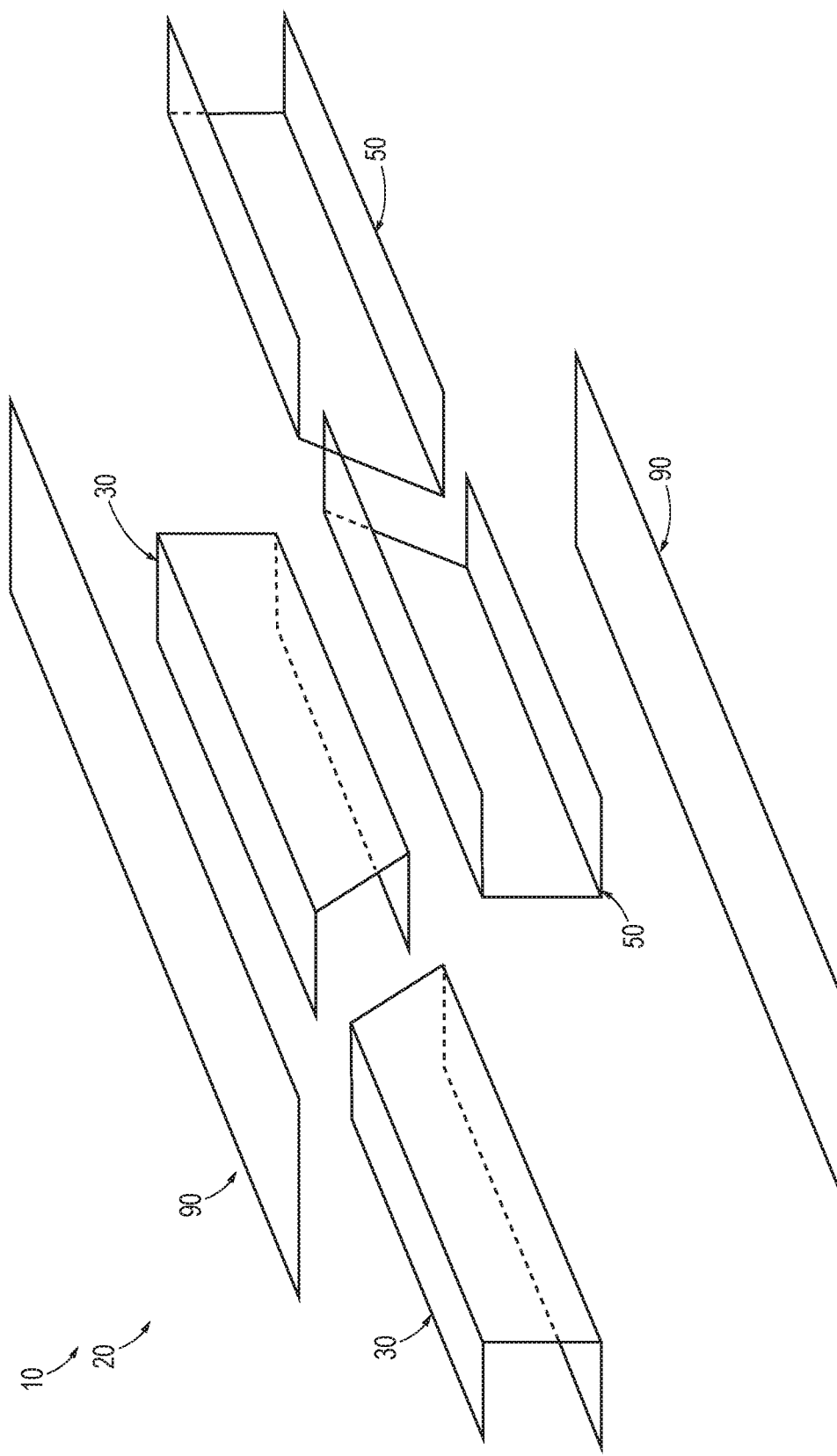
FIG. 17 is another exploded view of a fiber-reinforced thermoplastic composite structural member according to the present disclosure.
Figure 18:
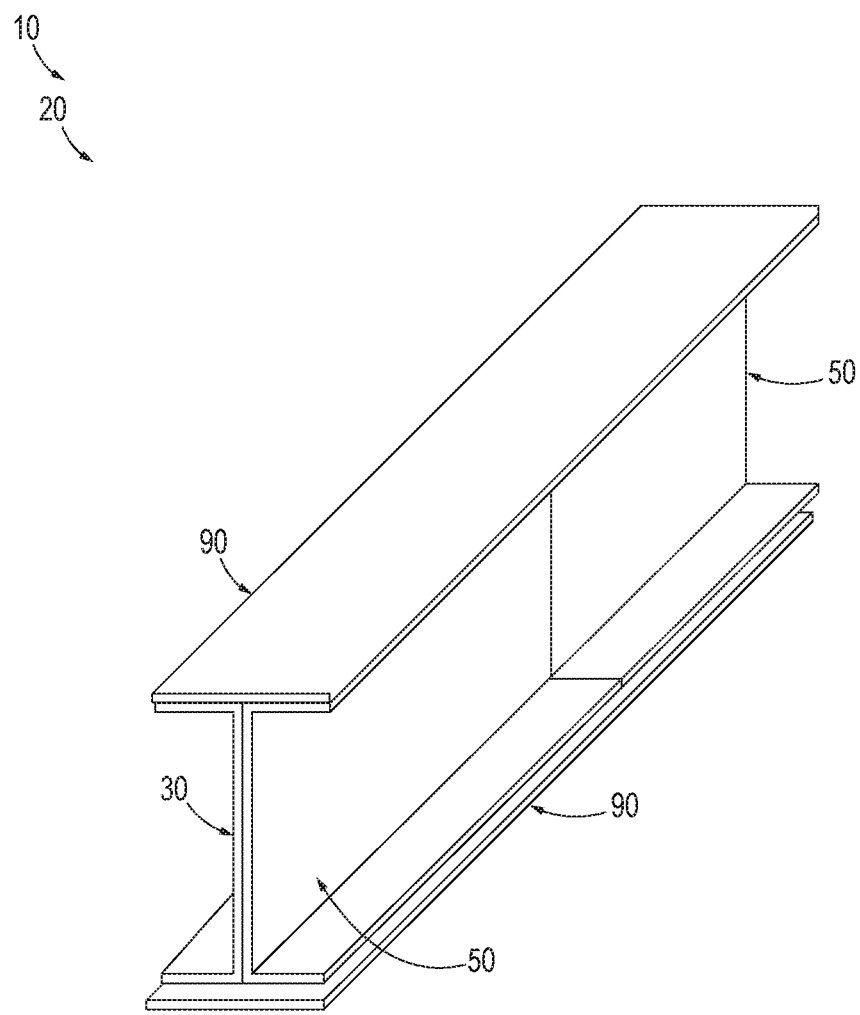
FIG. 18 is an assembled view of the fiber-reinforced thermoplastic composite structural member of FIG. 16.

As illustrated in FIGS. 16-18, FRTCSM 20 may include and/or be an elongate FRTCSM 20. Stated differently, a length of FRTCSM 20 may be greater than a width of FRTCSM 20 and/or may be greater than a height of FRTCSM 20. Correspondingly, a length of first thermoplastic sub-structure 30 may be greater than a width and/or height of first thermoplastic sub-structure 30. Similarly, a length of second thermoplastic sub-structure 50 may be greater than a width and/or height of second thermoplastic sub-structure 50. Examples of a ratio of the length of FRTCSM 20, first thermoplastic sub-structure 30, and/or second thermoplastic sub-structure 50 to a corresponding width and/or height include ratios of at least 2, at least 4, at least 6, at least 8, or at least 10.

First web 38 and/or second web 58 may have and/or define any suitable shape and/or size. In some examples, the shape of first web 38 may correspond to, be equal to, or be at least substantially equal to, the shape of second web 58. As an example, the first web may be a planar, or at least substantially planar, first web; and the second web may be a planar, or at least substantially planar, second web. As another example, the first web may be a straight, or at least substantially straight, first web; and the second web may be a straight, or at least substantially straight, second web. As another example, the first web may bend in at least one bend dimension; and the second web may bend in the at least one bend dimension. As another example, the first web may twist about at least one twist axis; and the second web may twist about the at least one twist axis.

Methods 100 may permit and/or facilitate formation of FRTCSMs 20 with properties and/or characteristics that would be time-consuming, difficult, expensive, and/or impossible to manufacture, to reliably manufacture, and/or to manufacture with a desired level of durability utilizing conventional fabrication techniques. As an example, methods 100 may permit and/or facilitate formation of FRTCSMs 20 that define elongate void space 98 and/or that are free of a composite radius filler within the elongate void space, as discussed herein. As another example, methods 100 may permit and/or facilitate formation of FRTCSMs where the number of plies of composite material within first thermoplastic sub-structure 30, second thermoplastic sub-structure 50, and/or cap sub-structure 90 varies along the length of FRTCSM 20. As another example, methods 100 may permit and/or facilitate formation of FRTCSMs 20 in which a transverse cross-section of first thermoplastic sub-structure 30, second thermoplastic sub-structure 50, and/or cap sub-structure 90 may be constant or may vary along the length thereof. As another example, methods 100 may permit and/or facilitate formation of FRTCSMs in which first flange 40 and/or second flange 60 may be continuous or discontinuous along the length thereof.

As a further example, methods 100 may permit and/or facilitate formation of a variety of different FRTCSMs 20. The variety of different FRTCSMs may have and/or define a variety of different shapes and/or sizes and/or may be integrated into a larger structure, such as aircraft 10, in a variety of different manners.

Figure 9:
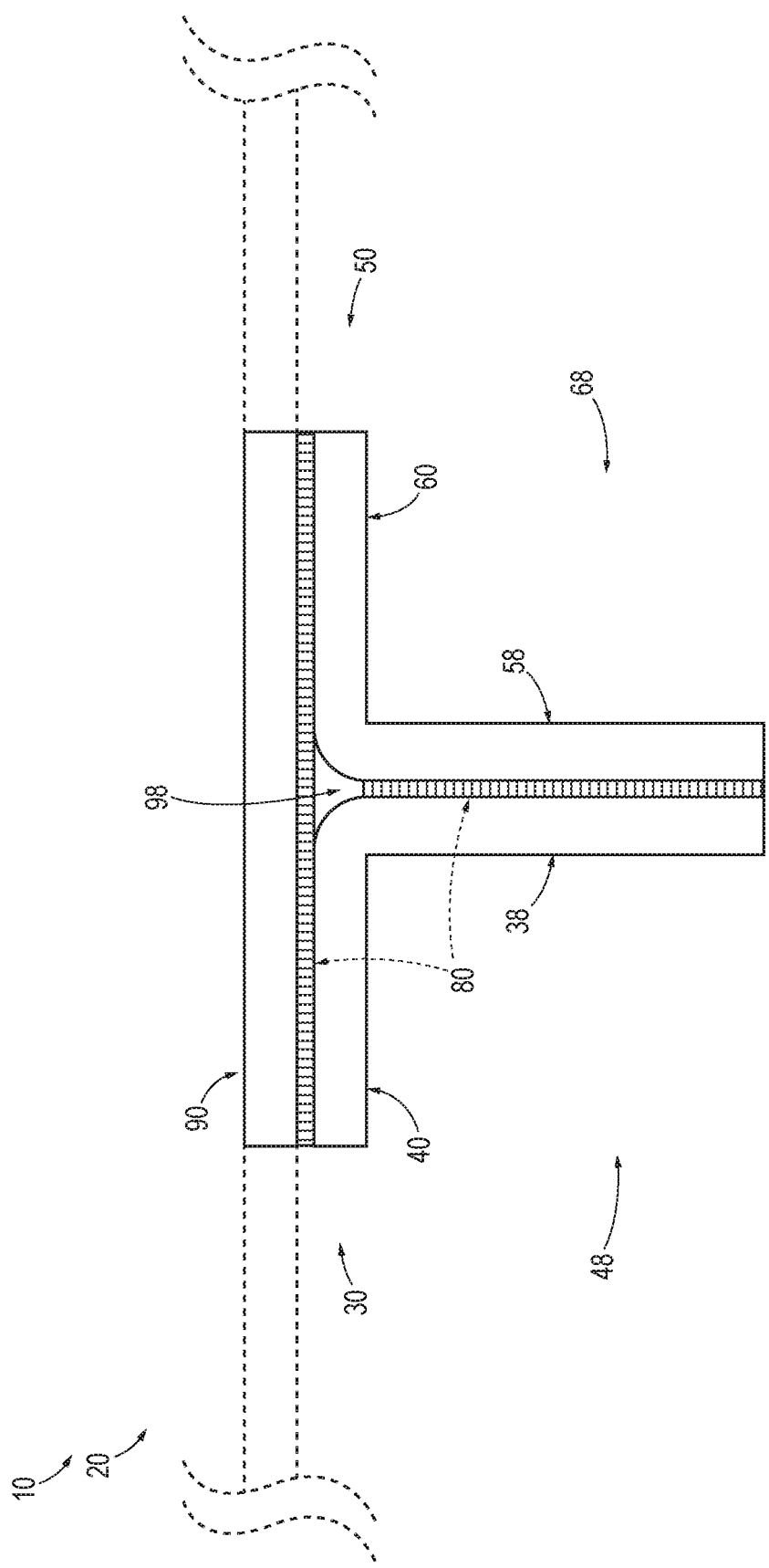
FIG. 9 is a schematic illustration of an example of a T-shaped fiber-reinforced thermoplastic composite structural member according to the present disclosure.

As a specific example, and as illustrated in FIG. 9, first thermoplastic sub-structure 30 may define a corresponding L-profile 48 and second thermoplastic sub-structure 50 also may define a corresponding L-profile 68. In such a configuration, FRTCSM 20 may be referred to herein as and/or may be a T-beam. As illustrated in solid lines in FIG. 9, the T-beam may include and/or be a stand-alone composite beam. Additionally or alternatively, and as illustrated in dashed lines in FIG. 9, cap sub-structure 90 may form and/or define a skin and/or a surface that extends past a remainder of the T-beam.

Figure 10:
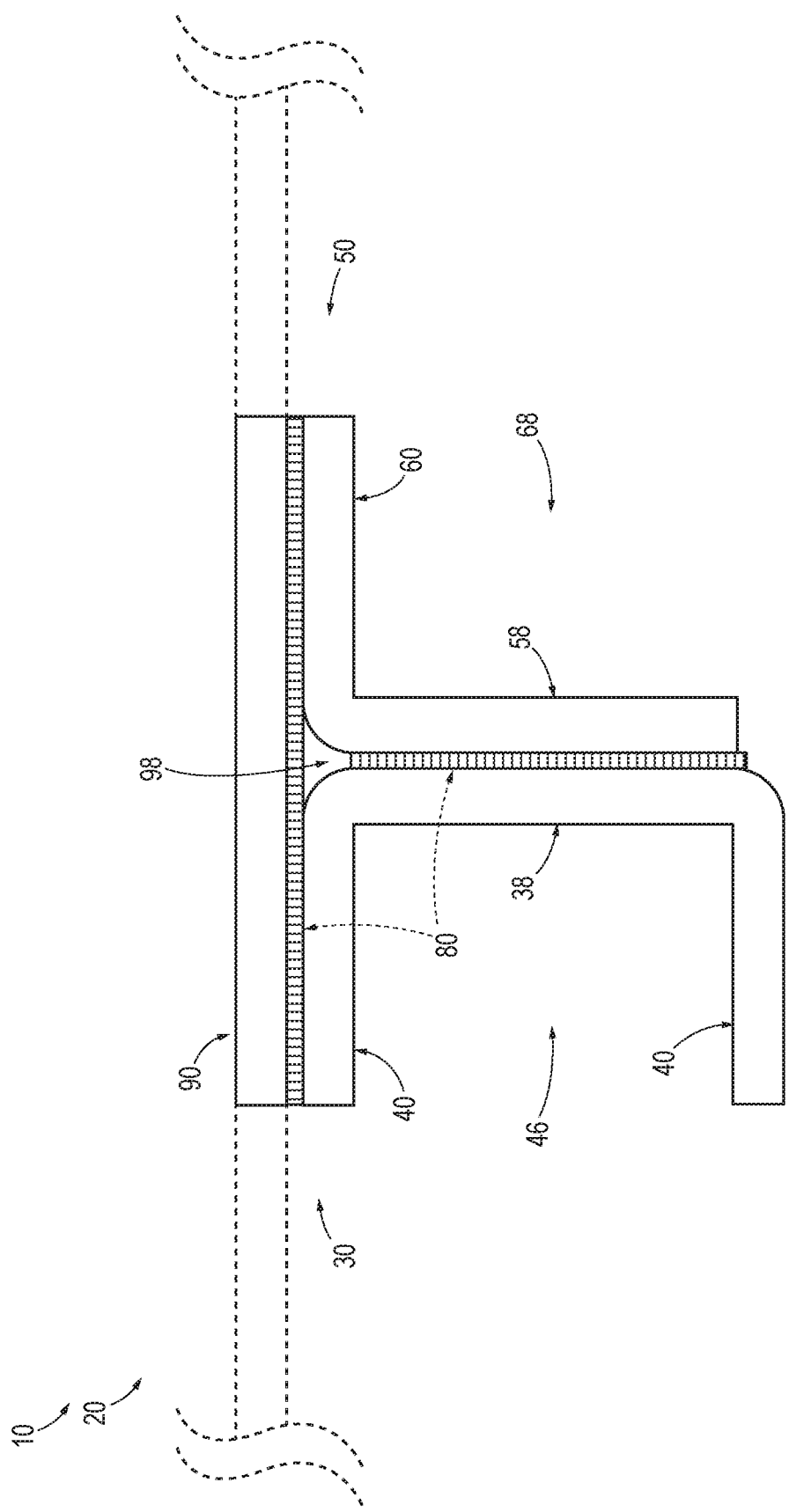
FIG. 10 is a schematic illustration of an example of a J-shaped fiber-reinforced thermoplastic composite structural member according to the present disclosure.

As another specific example, and as illustrated in FIG. 10, first thermoplastic sub-structure 30 may define a corresponding C-channel 46 and second thermoplastic sub-structure 50 may define a corresponding L-profile 68. In such a configuration, FRTCSM 20 may be referred to herein as and/or may be a J-beam. As illustrated in solid lines in FIG. 10, the J-beam may include and/or be a stand-alone composite beam. Additionally or alternatively, and as illustrated in dashed lines in FIG. 10, cap sub-structure 90 may form and/or define a skin and/or a surface that extends past a remainder of the J-beam.

As another specific example, and as illustrated in FIG. 13, first thermoplastic sub-structure 30 may define a corresponding C-channel 46 and second thermoplastic sub-structure 50 also may define a corresponding C-channel 66. In such a configuration, FRTCSM 20 may be referred to herein as and/or may be an H-beam and/or an I-beam. As illustrated in solid lines in FIG. 13, the H-beam and/or the I-beam may include and/or be a stand-alone composite beam. Additionally or alternatively, and as illustrated in dashed lines in FIG. 13, cap sub-structure 90 may form and/or define a skin and/or a surface that extends past a remainder of the I-beam.

With this in mind, FRTCSMs 20 may be utilized to form and/or define more complex structures, such as within aircraft 10, that otherwise would be more difficult and/or costly to define. As an example, and as illustrated in FIG. 14, two or more FRTCSMs 20, in the form of I-beams, may be integrated into a torsion box 16. In such a configuration, two cap sub-structures 90 may be single panels that, subsequent to the welding at 150, at least partially define both a first FRTCSM and a second FRTCSM of the two or more FRTCSMs 20. As another example, and as illustrated in FIG. 15, two or more FRTCSMs, in the form of I-beams, may be integrated into a pressure deck 18. In such a configuration, a first cap sub-structure 90 may be a single panel that, subsequent to the welding at 150, at least partially defines both a first FRTCSM and a second FRTCSM of the two or more FRTCSMs 20. In addition, a first individual cap structure may at least partially define only the first FRTCSM, while a second individual cap structure may at least partially define only the second FRTCSM.

Turning to FIGS. 16-18, methods 100 may permit and/or facilitate formation of FRTCSMs 20 of any suitable length. As an example, methods 100 may permit utilization of a plurality of first thermoplastic sub-structures 30 and/or of a plurality of second thermoplastic sub-structures 50 to define an overall length of FRTCSMs 20. In a particular example, FRTCSMs 20 may include a pair of first thermoplastic sub-structures 30 in the form of a pair of first thermoplastic C-channels that are arranged end-to-end to define a first butt join therebetween. Additionally or alternatively, FRTCSMs 20 may include a pair of second thermoplastic sub-structures 50 in the form of a pair of second thermoplastic C-channels that are arranged end-to-end to define a second butt join therebetween. The first butt join and the second butt join may be spatially offset from one another along the length of FRTCSM 20, such as to increase an overall strength of FRTCSM 20. Additionally or alternatively, the first butt join and the second butt join may be angled in different directions, as illustrated in FIG. 17, which also may increase the overall strength of FRTCSM 20.

As discussed, and in some examples, methods 100 also may include attaching the fiber-reinforced thermoplastic composite structural member at 155. The attaching at 155 may include operatively attaching the FRTCSM to at least one other component of an aircraft, such as to incorporate the FRTCSM into the aircraft. This may include operatively attaching to at least partially form and/or define any suitable component of the aircraft, examples of which include an airframe of the aircraft, a wing of the aircraft, a torsion box of the aircraft, and/or a pressure deck of the aircraft. The attaching at 155 may be performed in any suitable manner, such as via bolting, fastening, welding, and/or thermoplastically welding the FRTCSM to at least one other component of the aircraft.

Illustrative, non-exclusive examples of inventive subject matter according to the present disclosure are described in the following enumerated paragraphs:

A1. A method (100) of forming a fiber-reinforced thermoplastic composite structural member (20) from a first thermoplastic sub-structure (30) and a second thermoplastic sub-structure (50), wherein the first thermoplastic sub-structure (30) includes a first web (38), a first flange (40) that extends away from the first web (38), and a first transition region (44) between the first flange (40) and the first web (38), wherein the second thermoplastic sub-structure (50) includes a second web (58), a second flange (60) that extends away from the second web (58), and a second transition region (64) between the second flange (60) and the second web (58), the method (100) comprising positioning (115) the first thermoplastic sub-structure (30) and the second thermoplastic sub-structure (50) relative to one another such that first flange (40) extends away from the second flange (60) and also such that the first web (38) faces the second web (58);

compressing (120) the first web (38) and the second web (58) together; and welding (130) the first web (38) and the second web (58) to one another to at least partially define the fiber-reinforced thermoplastic composite structural member (20).

A2. The method (100) of paragraph A1, wherein the positioning (115) the first thermoplastic sub-structure (30) and the second thermoplastic sub-structure (50) includes positioning such that at least one of:

(i) a first flange surface (42) of the first flange (40) extends parallel, or at least substantially parallel, to a second flange surface (62) of the second flange (60); and (ii) the first flange surface (42) is coplanar, or at least substantially coplanar, with the second flange surface (62).

A3. The method (100) of any of paragraphs A1-A2, wherein one of:

(i) the first thermoplastic sub-structure (30) includes a thermoplastic resin and the second thermoplastic sub-structure (50) includes the thermoplastic resin; and (ii) the first thermoplastic sub-structure (30) includes a first thermoplastic resin (34), and the second thermoplastic sub-structure (50) includes a second thermoplastic resin (54) that differs from, and is compatible with, the first thermoplastic resin (34).

A4. The method (100) of any of paragraphs A1-A3, wherein one of:

(i) the first thermoplastic sub-structure (30) includes a fiber material and the second thermoplastic sub-structure (30) includes the fiber material;

(ii) the first thermoplastic sub-structure (30) includes a first fiber material (36), and the second thermoplastic sub-structure (50) includes a second fiber material (56) that differs from the first fiber material (36).

A5. The method (100) of paragraph A4, wherein at least one of the fiber material, the first fiber material (36), and the second fiber material (56) includes carbon fibers.

A6. The method (100) of any of paragraphs A1-A5, wherein:

(i) a length of the first thermoplastic sub-structure (30) is greater than a width of the first thermoplastic sub-structure (30); and (ii) a length of the second thermoplastic sub-structure (50) is greater than a width of the second thermoplastic sub-structure (50).

A7. The method (100) of any of paragraphs A1-A6, wherein a shape of the first web (38) corresponds to a shape of the second web (58).

A8. The method (100) of any of paragraphs A1-A7, wherein:
(i) the first web (38) is a planar, or at least substantially planar, first web (38); and
(ii) the second web (58) is a planar, or at least substantially planar, second web (58).

A8.1. The method (100) of any of paragraphs A1-A8, wherein:
(i) the first web (38) is a straight, or at least substantially straight, first web (38); and
(ii) the second web (58) is a straight, or at least substantially straight, second web (58).

A9. The method (100) of any of paragraphs A1-A7, wherein:
(i) the first web (38) bends in at least one bend dimension; and
(ii) the second web (58) bends in the at least one bend dimension.

A10. The method (100) of any of paragraphs A1-A7, wherein:
(i) the first web (38) twists about at least one twist axis; and
(ii) the second web (58) twists about the at least one twist axis.

A11. The method (100) of any of paragraphs A1-A10, wherein at least one of:
(i) the first thermoplastic sub-structure (30) is defined by a plurality of first plies of composite material (32); and
(ii) the second thermoplastic sub-structure (50) is defined by a plurality of second plies of composite material (52).

A12. The method (100) of any of paragraphs A1-A11, wherein one of:
(i) a transverse cross-section of the first thermoplastic sub-structure (30) is constant, or at least substantially constant, along a length of the first thermoplastic sub-structure (30); and
(ii) the transverse cross-section of the first thermoplastic sub-structure (30) varies as a function of length along the first thermoplastic sub-structure (30).

A13. The method (100) of any of paragraphs A1-A11, wherein one of:
(i) a transverse cross-section of the second thermoplastic sub-structure (50) is constant, or at least substantially constant, along a length of the second thermoplastic sub-structure (50); and
(ii) the transverse cross-section of the second thermoplastic sub-structure (50) varies as a function of length along the second thermoplastic sub-structure (50).

A14. The method (100) of any of paragraphs A1-A13, wherein:
(i) the first flange (40) is continuous along a/the length of the first thermoplastic sub-structure (30); and
(ii) the second flange (60) is continuous along a/the length of the second thermoplastic sub-structure (50).

A15. The method (100) of any of paragraphs A1-A13, wherein:
(i) the first flange (40) is discontinuous along a/the length of the first thermoplastic sub-structure (30); and
(ii) the second flange (60) is discontinuous along a/the length of the second thermoplastic sub-structure (50).

A16. The method (100) of any of paragraphs A1-A15, wherein, prior to the positioning (115) the first thermoplastic sub-structure (30) and the second thermoplastic sub-structure (50), the method (100) further includes providing (105) the first thermoplastic sub-structure (30) and the second thermoplastic sub-structure (50).

A17. The method (100) of any of paragraphs A1-A16, wherein the method (100) further includes:
(i) positioning (140) a cap sub-structure (90) relative to the first thermoplastic sub-structure (30) and the second thermoplastic sub-structure (50) such that the cap sub-structure faces (90) the first flange (40) and the second flange (60);
(ii) compressing (145) the cap sub-structure (90) to the first flange (40) and to the second flange (60); and
(iii) welding (150) the cap sub-structure (90) to the first flange (40) and to the second flange (60).

A18. The method (100) of paragraph A17, wherein the welding (150) the cap sub-structure (90) to the first flange (40) and to the second flange (60) includes initially welding the cap sub-structure (90) to one of the first flange (40) and the second flange (60) and subsequently welding the cap sub-structure (90) to the other of the first flange (40) and the second flange (60).

A19. The method (100) of paragraph A17, wherein the welding (150) the cap sub-structure (90) to the first flange (40) and to the second flange (60) includes at least partially simultaneously welding the cap sub-structure (90) to the first flange (40) and to the second flange (60).

A20. The method (100) of any of paragraphs A17-A19, wherein at least one of:
(i) a shape of the cap sub-structure (90) corresponds to a composite flange shape of a combination of the first flange (40) and the second flange (60);
(ii) a width of the cap sub-structure (90) corresponds to, or is at least substantially equal to, a width of the composite flange shape; and
(iii) a length of the cap sub-structure (90) corresponds to, or is at least substantially equal to, a length of the composite flange shape.

A21. The method (100) of any of paragraphs A17-A20, wherein the cap sub-structure (90) is defined by a sheet of composite material that extends past at least one, and optionally both, of the first flange (40) and the second flange (60).

A22. The method (100) of any of paragraphs A17-A21, wherein the welding (150) the cap sub-structure (90) includes defining an elongate void space (98) that is at least partially bounded by the cap sub-structure (90), the first transition region (44), and the second transition region (64).

A23. The method (100) of paragraph A22, wherein the elongate void space (98) is free of a composite radius filler.

A24. The method (100) of any of paragraphs A17-A23, wherein the method (100) further includes providing (135) the cap sub-structure (90).

A25. The method (100) of any of paragraphs A17-A24, wherein the first thermoplastic sub-structure (30) includes a pair of first flanges (40), wherein each first flange (40) of the pair of first flanges (40) extends away from a corresponding side of the first web (38), wherein the second thermoplastic sub-structure (50) includes a pair of second flanges (60), wherein each second flange (60) of the pair of second flanges (60) extends away from a corresponding side of the second web (58), wherein the fiber-reinforced thermoplastic composite structural member (20) includes a pair of cap sub-structures (90), and further wherein:
(i) the positioning (140) the cap sub-structure (90) includes positioning each cap sub-structure (90) of the pair of cap sub-structures (90) relative to a corresponding first flange (40) of the pair of first flanges (40) and also relative to a corresponding second flange (60) of the pair of second flanges (60) such that each cap sub-structure (90) faces the corresponding first flange (40) and the corresponding second flange (60);

(ii) the compressing (145) the cap sub-structure (90) includes compressing each cap sub-structure (90) to the corresponding first flange (30) and to the corresponding second flange (60); and (iii) the welding (150) the cap sub-structure (90) includes welding each cap sub-structure (90) to the corresponding first flange (30) and to the corresponding second flange (60).

A26. The method (100) of paragraph A25, wherein the first thermoplastic sub-structure (30) is a first thermoplastic C-channel (46), wherein the second thermoplastic sub-structure (50) is a second thermoplastic C-channel (66), and further wherein the fiber-reinforced thermoplastic composite structural member (20) is a fiber-reinforced thermoplastic composite structural I-beam.

A27. The method (100) of paragraph A26, wherein the fiber-reinforced thermoplastic composite structural I-beam is a first fiber-reinforced thermoplastic composite structural I-beam, wherein the method (100) further includes forming a second fiber-reinforced thermoplastic composite structural I-beam, and further wherein each cap sub-structure (90) is a single panel that, subsequent to the welding (150) the cap sub-structure (90), extends between and at least partially defines both the first fiber-reinforced thermoplastic composite structural I-beam and the second fiber-reinforced thermoplastic composite structural I-beam.

A28. The method (100) of paragraph A26, wherein the fiber-reinforced thermoplastic composite structural I-beam is a first fiber-reinforced thermoplastic composite structural I-beam, wherein the method (100) further includes forming a second fiber-reinforced thermoplastic composite structural I-beam, wherein a first cap sub-structure (90) of the pair of cap sub-structures (90) is a single panel that, subsequent to the welding (150) the cap sub-structure (90), extends between and at least partially defines both the first fiber-reinforced thermoplastic composite structural I-beam and the second fiber-reinforced thermoplastic composite structural I-beam, wherein a second cap sub-structure (90) of the pair of cap sub-structures (90) includes a first individual cap sub-structure (90) that, subsequent to the welding (150) the cap sub-structure (90), at least partially defines only one of the first fiber-reinforced thermoplastic composite structural I-beam and the second fiber-reinforced thermoplastic composite structural I-beam, and further wherein the second cap sub-structure (90) includes a second individual cap sub-structure (90) that, subsequent to the welding (150) the cap sub-structure (90), at least partially defines only one of the other of the first fiber-reinforced thermoplastic composite structural I-beam and the second fiber-reinforced thermoplastic composite structural I-beam.

A29. The method (100) of paragraph A26, wherein the fiber-reinforced thermoplastic composite structural member (20) includes:

(i) a pair of first thermoplastic C-channels (46) arranged end-to-end to define a first butt join therebetween; and (ii) a pair of second thermoplastic C-channels (66) arranged end-to-end to define a second butt join therebetween.

A30. The method (100) of paragraph A30, wherein the first butt join and the second butt join are spatially offset from one another along a length of the fiber-reinforced thermoplastic composite structural member (20).

A31. The method (100) of any of paragraphs A1-A24, wherein the first thermoplastic sub-structure (30) is a first thermoplastic C-channel (46), wherein the second thermoplastic sub-structure (50) is a second thermoplastic L-profile (68), and further wherein the fiber-reinforced thermoplastic composite structural member (20) is a fiber-reinforced thermoplastic composite structural J-beam.

A32. The method (100) of any of paragraphs A1-A31, wherein the welding (130) the first web (38) and the second web (58) to one another includes at least one of:

(i) induction welding the first web (38) and the second web (58) to one another;

(ii) conduction welding the first web (38) and the second web (58) to one another;

(iii) resistance welding the first web (38) and the second web (58) to one another; and (iv) ultrasonic welding the first web (38) and the second web (58) to one another.

A33. The method (100) of any of paragraphs A1-A32, wherein the welding (130) the first web (38) and the second web (58) to one another includes simultaneously welding an entire length of the first web (38) to the second web (58).

A34. The method (100) of any of paragraphs A1-A33, wherein the welding (130) the first web (38) and the second web (58) to one another includes progressively welding an/the entire length of the first web (38) to the second web (58), optionally wherein the progressively welding includes at least one of:

(i) operatively translating a welding structure, which is configured to perform the welding (130) the first web (38) and the second web (58) to one another, relative to the first thermoplastic sub-structure (30) and the second thermoplastic sub-structure (50); and (ii) operatively translating the first thermoplastic sub-structure (30) and the second thermoplastic sub-structure (50) relative to the welding structure.

A35. The method (100) of any of paragraphs A1-A34, wherein the welding (130) the first web (38) and the second web (58) to one another includes welding at least a threshold surface area fraction of a contact surface area between the first web (38) and the second web (58), wherein the threshold surface area fraction is 20%, 30%, 40%, 50%, 60%, 70%, at 80%, 90%, 95%, or 99%.

A36. The method (100) of any of paragraphs A1-A35, wherein the welding (130) the first web (38) and the second web (58) to one another includes melting a joining layer (80).

A37. The method (100) of any of paragraphs A1-A36, wherein the first thermoplastic sub-structure (30) includes a/the first thermoplastic resin (34) that defines a first thermoplastic resin melt temperature, wherein the second thermoplastic sub-structure (50) includes a/the second thermoplastic resin (54) that defines a second thermoplastic resin melt temperature, wherein the joining layer (80) includes a joining layer thermoplastic resin (82) that defines a joining layer thermoplastic resin melt temperature that is less than the first thermoplastic resin melt temperature and also less than the second thermoplastic resin melt temperature, and further wherein the melting the joining layer (80) includes heating to a joining layer temperature that is greater than the joining layer thermoplastic resin melt temperature and less than both the first thermoplastic resin melt temperature and the second thermoplastic resin melt temperature.

A38. The method (100) of any of paragraphs A36-A37, wherein the joining layer (80) at least partially defines an outer surface of at least one of the first thermoplastic sub-structure (30) and the second thermoplastic sub-structure (50).

A39. The method (100) of any of paragraphs A36-A37, wherein, prior to the welding (130) the first web (38) and the second web (58) to one another, the method (100) further includes positioning (110) the joining layer (80) between the first web (38) and the second web (58).

A40. The method (100) of any of paragraphs A1-A39, wherein, during the welding (130) the first web (38) and the second web (58) to one another, the method (100) further includes at least one of: (i) thermally isolating the first flange (40) from the first web (38);
   (ii) thermally isolating the first transition region (44) from the first web (38);
   (iii) thermally isolating the second flange (60) from the second web (58); and
   (iv) thermally isolating the second transition region (64) from the second web (58).

A41. The method (100) of paragraph A40, wherein the thermally isolating includes thermally isolating with a thermally insulating material.

A42. The method (100) of any of paragraphs A1-A41, wherein, during the welding (130) the first web (38) and the second web (58) to one another, the method (100) further includes actively cooling at least one of:
   (i) the first flange (40);
   (ii) the first transition region (44);
   (iii) the second flange (60); and
   (iv) the second transition region (64).

A43. The method (100) of paragraph A42, wherein the actively cooling includes actively cooling utilizing at least one of:
   (i) a contained coolant fluid stream;
   (ii) an air stream; and
   (iii) a cooling fixture.

A44. The method (100) of any of paragraphs A1-A43, wherein, during the welding (130) the first web (38) and the second web (58) to one another, the method (100) further includes maintaining the first flange (40) and the first transition region (44) below a melt temperature of the first thermoplastic sub-structure (30) and maintaining the second flange (60) and the second transition region (64) below a melt temperature of the second thermoplastic sub-structure (50).

B1. A method (100) of forming an aircraft (10), the method (100) comprising:
   forming (100) a fiber-reinforced thermoplastic composite structural member (20) utilizing the method (100) of any of paragraphs A1-A44; and
   operatively attaching (155) the fiber-reinforced thermoplastic composite structural member (20) to at least one other component of the aircraft (10).

B2. The method (100) of paragraph B1, wherein the operatively attaching (155) includes at least partially defining at least one of:
   (i) an airframe (12) of the aircraft (10);
   (ii) a wing (14) of the aircraft (10);
   (iii) a torsion box (16) of the aircraft (10); and
   (iv) a pressure deck (18) of the aircraft (10).

C1. A fiber-reinforced thermoplastic composite structural member (20), comprising:
   a first thermoplastic sub-structure (30), wherein the first thermoplastic sub-structure (30) includes a first web (38), a first flange (40) that extends away from the first web (38), and a first transition region (44) between the first flange (40) and the first web (38); and
   a second thermoplastic sub-structure (50), wherein the second thermoplastic sub-structure (50) includes a second web (58), a second flange (60) that extends away from the second web (58), and a second transition region (64) between the second flange (60) and the second web (58);
   wherein the first web (38) is welded to the second web (58).

C2. The fiber-reinforced thermoplastic composite structural member (20) of paragraph C1, wherein the fiber-reinforced thermoplastic composite structural member (20) further includes a cap sub-structure (90) that is welded to the first flange (40) and to the second flange (60).

C3. The fiber-reinforced thermoplastic composite structural member (20) of paragraph C2, wherein the fiber-reinforced thermoplastic composite structural member (20) further includes an elongate void space (98) that is at least partially bounded by the cap sub-structure (90), the first transition region (44), and the second transition region (64).

C4. The fiber-reinforced thermoplastic composite structural member (20) of any of paragraphs C2-C3, wherein the first flange (40) includes a pair of first flanges (40), wherein each first flange (40) of the pair of first flanges (40) extends away from a corresponding side of the first web (38), wherein the second flange (60) includes a pair of second flanges (60), wherein each second flange (60) of the pair of second flanges (60) extends away from a corresponding side of the second web (58), wherein the cap sub-structure (90) includes a pair of cap sub-structures (90), and further wherein each cap sub-structure (90) is welded to a corresponding first flange (40) and to a corresponding second flange (60).

C5. The fiber-reinforced thermoplastic composite structural member (20) of any of paragraphs C2-C4, wherein the first thermoplastic sub-structure (30) is a first thermoplastic C-channel (46), wherein the second thermoplastic sub-structure (50) is a second thermoplastic C-channel (66), and further wherein the fiber-reinforced thermoplastic composite structural member (20) includes a fiber-reinforced thermoplastic composite structural I-beam.

C6. The fiber-reinforced thermoplastic composite structural member (20) of paragraph C5, wherein the fiber-reinforced thermoplastic composite structural I-beam is a first fiber-reinforced thermoplastic composite structural I-beam, wherein the fiber-reinforced thermoplastic composite structural member (20) further includes a second fiber-reinforced thermoplastic composite structural I-beam, and further wherein each cap sub-structure (90) is a single panel that is welded to both the first fiber-reinforced thermoplastic composite structural I-beam and the second fiber-reinforced thermoplastic composite structural I-beam.

C7. The fiber-reinforced thermoplastic composite structural member (20) of paragraph C5, wherein the fiber-reinforced thermoplastic composite structural I-beam is a first fiber-reinforced thermoplastic composite structural I-beam, wherein the fiber-reinforced thermoplastic composite structural member (20) further includes a second fiber-reinforced thermoplastic composite structural I-beam, wherein a first cap sub-structure (90) of the pair of cap sub-structures (90) is a single panel that is welded to both the first fiber-reinforced thermoplastic composite structural I-beam and the second fiber-reinforced thermoplastic composite structural I-beam, wherein a second cap sub-structure (90) of the pair of cap sub-structures (90) includes a first individual cap sub-structure that is welded to only one of the first fiber-reinforced thermoplastic composite structural I-beam and the second fiber-reinforced thermoplastic composite structural I-beam, and further wherein the second cap sub-structure (90) includes a second individual cap sub-structure (90) that is welded to only one of the other of the first fiber-reinforced thermoplastic composite structural I-beam and the second fiber-reinforced thermoplastic composite structural I-beam.

C8. The fiber-reinforced thermoplastic composite structural member (20) of any of paragraphs C1-C3, wherein the first thermoplastic sub-structure (30) is a first thermoplastic C-channel (46), wherein the second thermoplastic sub-structure (50) is a second thermoplastic L-profile (68), and further wherein the fiber-reinforced thermoplastic composite structural member (20) is a fiber-reinforced thermoplastic composite structural J-beam.

D1. An aircraft (10), comprising:
a fuselage structure (12); and
a wing structure (14) that is operatively attached to the fuselage structure (12);
wherein at least one of the fuselage structure (12) and the wing structure (14) is at least partially defined by the fiber-reinforced thermoplastic composite structural member (20) of any of paragraphs C1-C8.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of forming a fiber-reinforced thermoplastic composite structural member from a first thermoplastic sub-structure and a second thermoplastic sub-structure, wherein the first thermoplastic sub-structure includes a first web, a first flange that extends away from the first web, and a first transition region between the first flange and the first web, wherein the second thermoplastic sub-structure includes a second web, a second flange that extends away from the second web, and a second transition region between the second flange and the second web, the method comprising:

positioning the first thermoplastic sub-structure and the second thermoplastic sub-structure relative to one another such that the first flange extends away from the second flange and also such that the first web faces the second web;
compressing the first web and the second web together; and
welding the first web and the second web to one another to at least partially define the fiber-reinforced thermoplastic composite structural member, wherein, during the welding the first web and the second web to one another, the method further includes maintaining the first flange and the first transition region below a melt temperature of the first thermoplastic sub-structure and maintaining the second flange and the second transition region below a melt temperature of the second thermoplastic sub-structure.

2. The method of claim 1, wherein the positioning the first thermoplastic sub-structure and the second thermoplastic sub-structure includes positioning such that at least one of:
(i) a first flange surface of the first flange extends parallel to a second flange surface of the second flange; and
(ii) the first flange surface is coplanar with the second flange surface.

3. The method of claim 1, wherein:
(i) a length of the first thermoplastic sub-structure is greater than a width of the first thermoplastic sub-structure; and
(ii) a length of the second thermoplastic sub-structure is greater than a width of the second thermoplastic sub-structure.

4. The method of claim 1, wherein a shape of the first web corresponds to a shape of the second web.

5. The method of claim 1, wherein the method further includes:
(i) positioning a cap sub-structure relative to the first thermoplastic sub-structure and the second thermoplastic sub-structure such that the cap sub-structure faces the first flange and the second flange;
(ii) compressing the cap sub-structure to the first flange and to the second flange; and
(iii) welding the cap sub-structure to the first flange and to the second flange.

6. The method of claim 5, wherein the welding the cap sub-structure to the first flange and to the second flange includes initially welding the cap sub-structure to one of the first flange and the second flange and subsequently welding the cap sub-structure to the other of the first flange and the second flange.

7. The method of claim 5, wherein welding the cap sub-structure to the first flange and to the second flange includes at least partially simultaneously welding the cap sub-structure to the first flange and to the second flange.

8. The method of claim 5, wherein the welding the cap sub-structure includes defining an elongate void space that is at least partially bounded by the cap sub-structure, the first transition region, and the second transition region.

9. The method of claim 8, wherein the elongate void space is free of a composite radius filler.

10. The method of claim 5, wherein the first thermoplastic sub-structure includes a pair of first flanges, wherein each first flange of the pair of first flanges extends away from a corresponding side of the first web, wherein the second thermoplastic sub-structure includes a pair of second flanges, wherein each second flange of the pair of second flanges extends away from a corresponding side of the second web, wherein the cap sub-structure includes a pair of cap sub-structures, and further wherein:
(i) the positioning the cap sub-structure includes positioning each cap sub-structure of the pair of cap sub-structures relative to a corresponding first flange of the pair of first flanges and also relative to a corresponding second flange of the pair of second flanges such that each cap sub-structure faces the corresponding first flange and the corresponding second flange;
(ii) the compressing the cap sub-structure includes compressing each cap sub-structure to the corresponding first flange and to the corresponding second flange; and
(iii) the welding the cap sub-structure includes welding each cap sub-structure to the corresponding first flange and to the corresponding second flange.

11. The method of claim 10, wherein the first thermoplastic sub-structure is a first thermoplastic C-channel, wherein the second thermoplastic sub-structure is a second thermoplastic C-channel, and further wherein the fiber-reinforced thermoplastic composite structural member is a fiber-reinforced thermoplastic composite structural I-beam.

12. The method of claim 11, wherein the fiber-reinforced thermoplastic composite structural I-beam is a first fiber-reinforced thermoplastic composite structural I-beam, wherein the method further includes forming a second fiber-reinforced thermoplastic composite structural I-beam, and further wherein each cap sub-structure is a single panel that, subsequent to the welding the cap sub-structure, extends between and at least partially defines both the first fiber-reinforced thermoplastic composite structural I-beam and the second fiber-reinforced thermoplastic composite structural I-beam.

13. The method of claim 11, wherein the fiber-reinforced thermoplastic composite structural I-beam is a first fiber-reinforced thermoplastic composite structural I-beam, wherein the method further includes forming a second fiber-reinforced thermoplastic composite structural I-beam, wherein a first cap sub-structure of the pair of cap sub-structures is a single panel that, subsequent to the welding the cap sub-structure, extends between and at least partially defines both the first fiber-reinforced thermoplastic composite structural I-beam and the second fiber-reinforced thermoplastic composite structural I-beam, wherein a second cap sub-structure of the pair of cap sub-structures includes a first individual cap sub-structure that, subsequent to the welding the cap sub-structure, at least partially defines only one of the first fiber-reinforced thermoplastic composite structural I-beam and the second fiber-reinforced thermoplastic composite structural I-beam, and further wherein the second cap sub-structure includes a second individual cap sub-structure that, subsequent to the welding the cap sub-structure, at least partially defines only one of the other of the first fiber-reinforced thermoplastic composite structural I-beam and the second fiber-reinforced thermoplastic composite structural I-beam.

14. The method of claim 1, wherein the first thermoplastic sub-structure is a first thermoplastic C-channel, wherein the second thermoplastic sub-structure is a second thermoplastic L-profile, and further wherein the fiber-reinforced thermoplastic composite structural member is a fiber-reinforced thermoplastic composite structural J-beam.

15. The method of claim 1, wherein the welding the first web and the second web to one another includes melting a joining layer, wherein the first thermoplastic sub-structure includes a first thermoplastic resin that defines a first thermoplastic resin melt temperature, wherein the second thermoplastic sub-structure includes a second thermoplastic resin that defines a second thermoplastic melt temperature, wherein the joining layer includes a joining layer thermoplastic resin that defines a joining layer thermoplastic resin melt temperature that is less than the first thermoplastic resin melt temperature and less than the second thermoplastic resin melt temperature, and further wherein the melting the joining layer includes heating to a joining layer temperature that is greater than the joining layer thermoplastic resin melt temperature and less than both the first thermoplastic resin melt temperature and the second thermoplastic resin melt temperature.

16. The method of claim 1, wherein, during the welding the first web and the second web to one another, the method further includes at least one of:
  (i) thermally isolating the first flange from the first web;
  (ii) thermally isolating the first transition region from the first web;
  (iii) thermally isolating the second flange from the second web; and
  (iv) thermally isolating the second transition region from the second web.

17. The method of claim 1, wherein, during the welding the first web and the second web to one another, the method further includes actively cooling at least one of:
  (i) the first flange;
  (ii) the first transition region;
  (iii) the second flange; and
  (iv) the second transition region.

18. A method of forming a fiber-reinforced thermoplastic composite structural member from a first thermoplastic sub-structure and a second thermoplastic sub-structure, wherein the first thermoplastic sub-structure includes a first web, a first flange that extends away from the first web, and a first transition region between the first flange and the first web, wherein the second thermoplastic sub-structure includes a second web, a second flange that extends away from the second web, and a second transition region between the second flange and the second web, the method comprising:
  positioning the first thermoplastic sub-structure and the second thermoplastic sub-structure relative to one another, such that the first flange extends away from the second flange and also such that the first web faces the second web;
  compressing the first web and the second web together; and
  welding the first web and the second web to one another to at least partially define the fiber-reinforced thermoplastic composite structural member;
  wherein the welding the first web and the second web to one another includes melting a joining layer;
  wherein the first thermoplastic sub-structure includes a first thermoplastic resin that defines a first thermoplastic resin melt temperature;
  wherein the second thermoplastic sub-structure includes a second thermoplastic resin that defines a second thermoplastic melt temperature;
  wherein the joining layer includes a joining layer thermoplastic resin that defines a joining layer thermoplastic resin melt temperature that is less than the first thermoplastic resin melt temperature and less than the second thermoplastic resin melt temperature; and
  further wherein the melting the joining layer includes heating to a joining layer temperature that is greater than the joining layer thermoplastic resin melt temperature and less than both the first thermoplastic resin melt temperature and the second thermoplastic resin melt temperature.

19. A method of forming a fiber-reinforced thermoplastic composite structural member from a first thermoplastic sub-structure and a second thermoplastic sub-structure, wherein the first thermoplastic sub-structure includes a first web, a first flange that extends away from the first web, and a first transition region between the first flange and the first web, wherein the second thermoplastic sub-structure includes a second web, a second flange that extends away from the second web, and a second transition region between the second flange and the second web, the method comprising:
  positioning the first thermoplastic sub-structure and the second thermoplastic sub-structure relative to one another such that the first flange extends away from the second flange and also such that the first web faces the second web;
  compressing the first web and the second web together; and
  welding the first web and the second web to one another to at least partially define the fiber-reinforced thermoplastic composite structural member, wherein, during the welding the first web and the second web to one another, the method further includes at least one of:
  (i) thermally isolating the first flange from the first web;
  (ii) thermally isolating the first transition region from the first web;
  (iii) thermally isolating the second flange from the second web; and
  (iv) thermally isolating the second transition region from the second web.

20. The method of claim 19, wherein the first thermoplastic sub-structure is a first thermoplastic C-channel, wherein the second thermoplastic sub-structure is a second thermoplastic L-profile, and further wherein the fiber-reinforced thermoplastic composite structural member is a fiber-reinforced thermoplastic composite structural J-beam.

* * * * *